United States Patent
Hayashi

(10) Patent No.: US 7,008,323 B1
(45) Date of Patent: Mar. 7, 2006

(54) IMAGE GENERATION METHOD AND PROGRAM

(75) Inventor: Atsushi Hayashi, Yokohama (JP)

(73) Assignee: Namco Ltd., Tokyo (JP)

(*) Notice: Subject to any disclaimer, the term of this patent is extended or adjusted under 35 U.S.C. 154(b) by 526 days.

(21) Appl. No.: 09/762,955

(22) PCT Filed: Jun. 2, 2000

(86) PCT No.: PCT/JP00/03591

§ 371 (c)(1),
(2), (4) Date: Mar. 23, 2001

(30) Foreign Application Priority Data

Jun. 17, 1999 (JP) .................................. 11-171313

(51) Int. Cl.
A63F 9/24 (2006.01)
(52) U.S. Cl. .......................................... 463/32; 463/33
(58) Field of Classification Search ................ 463/1–2, 463/30–35, 36–39, 49–57
See application file for complete search history.

(56) References Cited

U.S. PATENT DOCUMENTS 5,704,837 A * 1/1998 Iwasaki et al. ............... 463/38
5,853,324 A 12/1998 Kami et al.

FOREIGN PATENT DOCUMENTS

| JP | A 9-50539 | 2/1997 |
| JP | A 9-131466 | 5/1997 |
| JP | A 10-165647 | 6/1998 |

* cited by examiner

*Primary Examiner*—Mark Sager
(74) *Attorney, Agent, or Firm*—Oliff & Berridge, PLC

(57) ABSTRACT

An objective is to provide an image generation system and program which can implement a realistic image with less processing load and without giving any unnatural feel to a player. It is determined whether or not any obstruction OB intervenes between an enemy character controlled by a computer and a viewpoint VP (or player's character) (or whether or not the obstruction OB exists on a line connecting an enemy character to a viewpoint The present invention is particularly effective when the motion of the enemy character C1 is generated in real time through the physical simulation.

32 Claims, 19 Drawing Sheets

FIG. 6
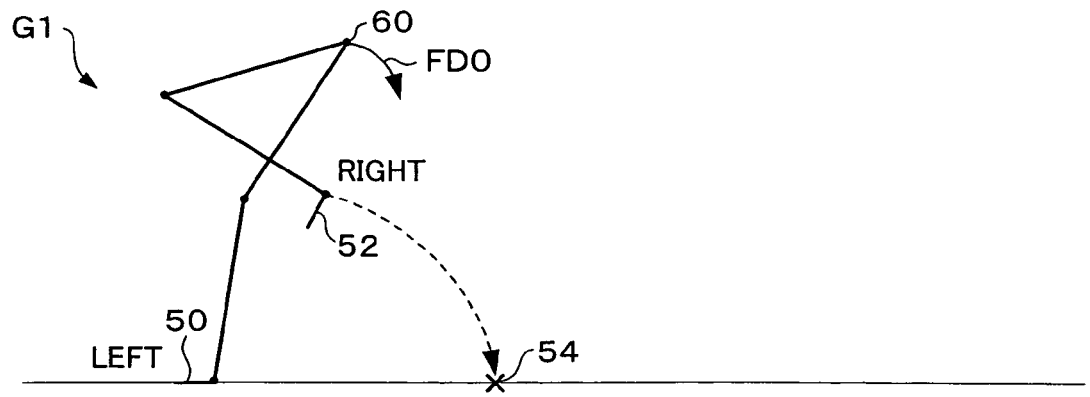
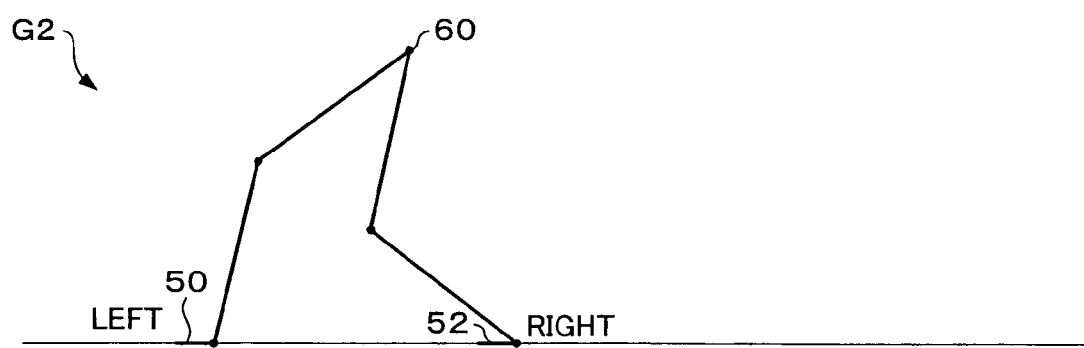
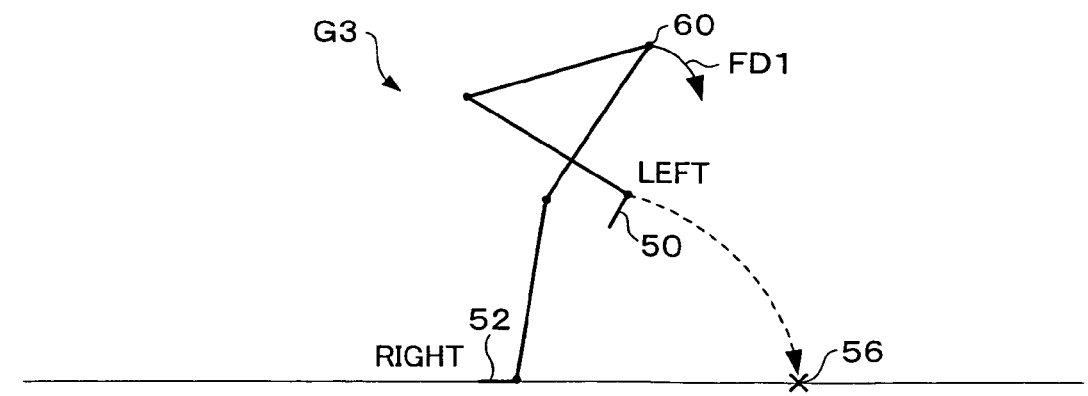
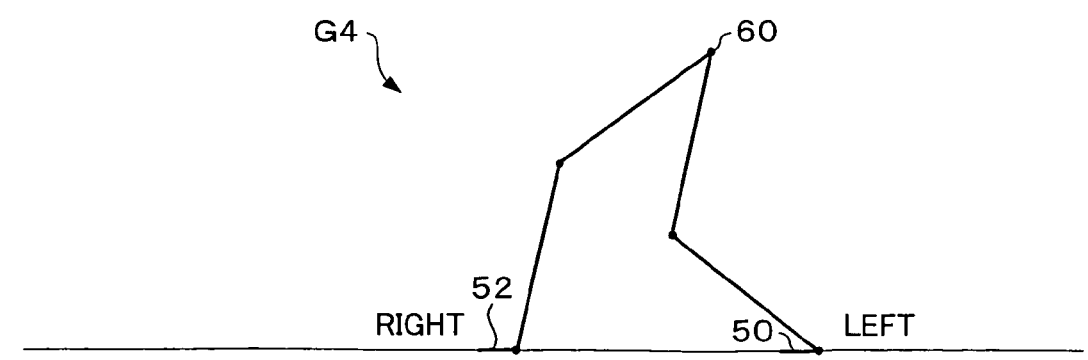

FIG. 7A
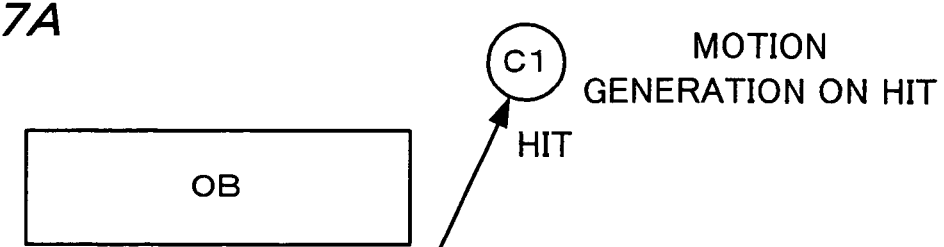
FIG. 7B
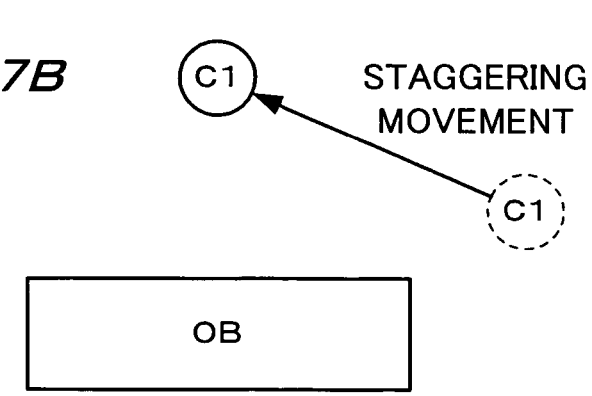

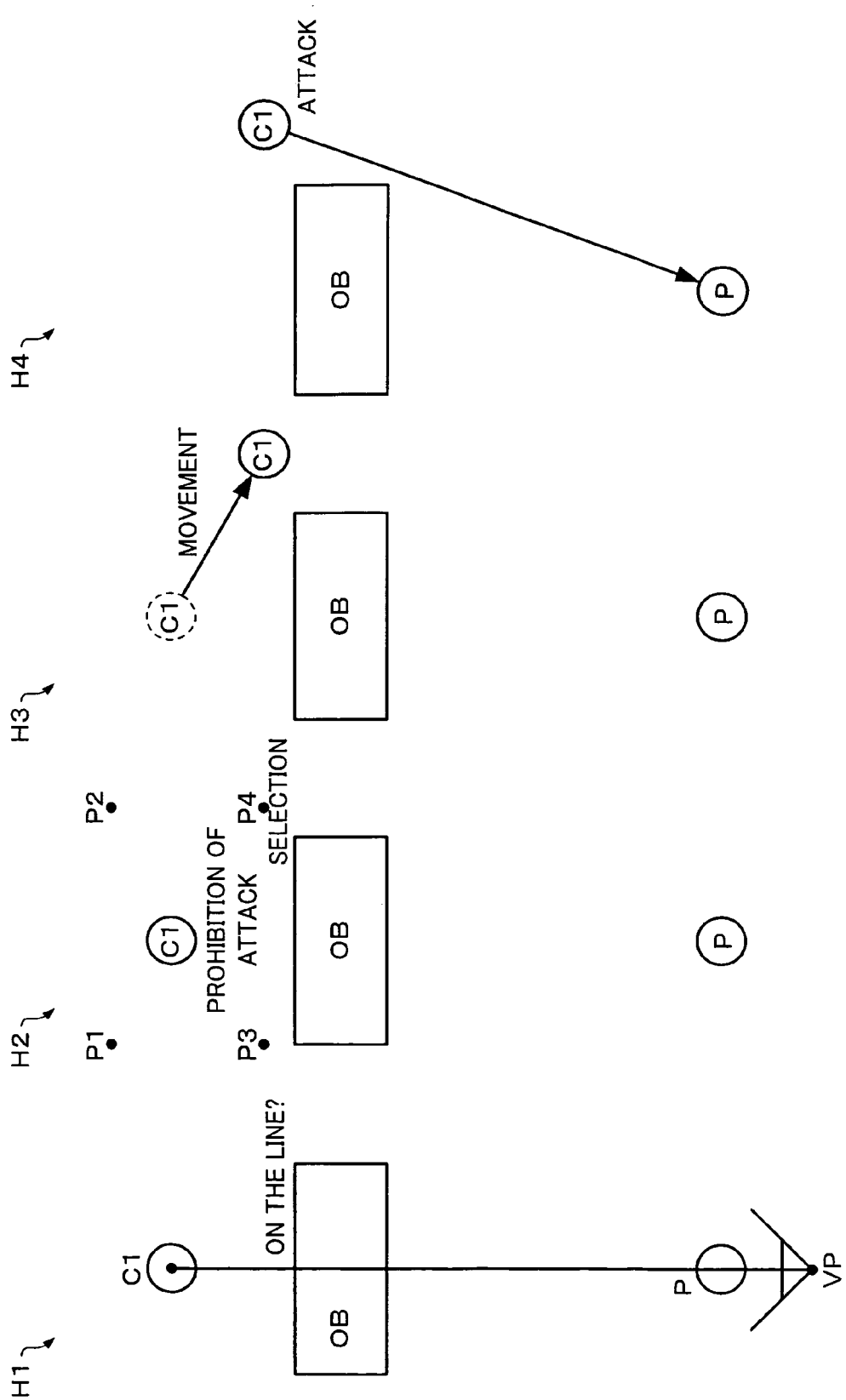

IMAGE GENERATION METHOD AND PROGRAM

TECHNICAL FIELD

The present invention relates to an image generation system and program.

BACKGROUND ART

There is known an image generation system for generating an image which is visible from a given viewpoint within an object space, that is, a virtual three-dimensional space. This is highly popular since players can experience a so-called virtual reality. For an image generation system by which a player can enjoy a gun game, the player can enjoy a three-dimensional game by using a gun-type controller (or shooting device) to shoot various target objects such as enemy characters (or computer objects) which are displayed on a screen.

It has been found that such an image generation system for gun game had one problem.

Such a problem is that if there is any obstruction is between a player (or a player's object) and an enemy character, a shot (or bullet) from the enemy character can pass through the obstruction and hit the player. This will render the player displeasing and impair the player's immersion in the game.

This problem may be overcome to some degree, for example, by using a certain technique of modifying the layout or moving route of the enemy characters. However, such a technique has a limitation.

Particularly, if the behavior of an enemy character cannot previously be determined, that is, if it will fully change depending on how the shot from the player hits the enemy character, the aforementioned technique cannot well work.

DISCLOSURE OF THE INVENTION

It is therefore an objective of the present invention to provide an image generation system and program which can implement a realistic image not rendering the player displeasing with less processing load.

To this end, the present invention provides an image generation system comprising: means for determining whether or not an intervening object intervenes between a first computer object controlled by a computer and a player's object controlled by a player or viewpoint, and for controlling an action of the first computer object according to the determination; and means for generating an image containing the image of the first computer object. A computer-usable information storage medium of the invention comprises information (or program or data) for implementing (or executing) the above-described means. The present invention further provides a program embodied on an information storage medium or in a carrier wave, and the program comprises a processing routine for implementing (or executing) the above-described means.

According to the present invention, it is determined whether or not any intervening object intervenes between the first computer object and the player's object or viewpoint. According to this determination, the action of the first computer object is controlled. Thus, even if any trouble occurs due to the intervening object, the action of the first computer object can properly be controlled. It is desirable in such a case that the first computer object is controlled not to act on the player.

The image generation system, information storage medium and program according to the present invention may determine whether or not the intervening object intervenes between the first computer object and the player's object or viewpoint by determining whether or not the intervening object exists on a line connecting between the first computer object and the player's object or viewpoint. This can simplify the detection of the intervening object.

The present invention further provides an image generation system comprising: means for preventing a first computer object controlled by a computer from acting on a player when an intervening object intervenes between the first computer object and a player's object or viewpoint controlled by the player; and means for generating an image containing the image of the first computer object. A computer-usable information storage medium of the invention comprises information (or program or data) for implementing (or executing) the above-described means. The present invention further provides a program embodied on an information storage medium or in a carrier wave, and the program comprises a processing routine for implementing (or executing) the above-described means.

According to the present invention, when the intervening object intervenes between the first computer object and the player's object or viewpoint, the action of the first computer object will not affect the player. This can overcome such a problem that the action of the first computer object affects the player passing through the intervening object.

In the image generation system, information storage medium and program according to the present invention, acting on the player by the first computer object may be prohibited or restricted when the intervening object intervenes between the first computer object and the player's object or viewpoint. This can prevent or restrict such a trouble that the action of the first computer object affects the player passing through the intervening object.

In the image generation system, information storage medium and program according to the present invention, the first computer object may be moved to a given moving target position when the intervening object intervenes between the first computer object and the player's object or viewpoint. This makes it possible to move the first computer object to a moving target position suitable for acting on the player. This can generate an image that will not cause the player to receive an unnatural feeling.

In the image generation system, information storage medium and program according to the present invention, the first computer object may be made to stand by when the intervening object is a second computer object controlled by the computer. For example, the first computer object may stand by until the second computer object is erased. This can naturally overcome the problem caused by the intervention of the second computer object even though any additional procedure such as movement of the first computer object is not carried out.

In the image generation system, information storage medium and program according to the present invention, the first computer object may be erased when the first computer object moves out of the player's view. This can avoid such an unnatural feeling for the player that it is affected by the action of the first computer object which has moved out of the player's view.

In the image generation system, information storage medium and program according to the present invention, a motion of the first computer object may be generated by a physical simulation. Various motions of the first computer object which may require a large amount of data depending on the contents of the motion play (replay) can be implemented with less data by the motion generation. When the motion of the first computer object is generated by the physical simulation in such a manner, the moving position of the first computer object can not be expected. This may cause the intervention of an intervening object between the first computer object and the player's object or viewpoint. According to the present invention, however, such a problem can effectively be overcome by appropriately controlling the action of the first computer object, for example.

In the image generation system, information storage medium and program according to the present invention, the motion of the first computer object may be generated by a physical simulation when hitting; whether or not the intervening object intervenes between the first computer object and the player's object or viewpoint may be determined when a given time has elapsed after the hitting; and the action of the first computer object may be controlled according to this determination. Thus, even if the first computer object moves to an unexpected position due to the hitting impact, such a situation can appropriately be dealt with according to the determination relating to whether or not the intervening object intervenes between the first computer object and the player's object or viewpoint.

In the image generation system, information storage medium and program according to the present invention, the first computer object may be an object attacking the player, and wherein the attack of the first computer object acts on the player without obstruction by the intervening object. In such a case, a player may be attacked by the first computer object passing through the intervening object. According to the present invention, however, it can effectively be overcome by appropriately controlling the action of the first computer object.

BRIEF DESCRIPTION OF THE DRAWINGS

FIG. 6 illustrates the generation of lower-body motion for an enemy character.

FIGS. 7A and 7B illustrate an enemy character which has been hit and then moves behind an obstruction while staggering.

FIG. 9 illustrates a technique of controlling an action of an enemy character according to the embodiment of the present invention.

BEST MODE FOR CARRYING OUT THE INVENTION

Several preferred embodiments of the present invention will now be described with reference to the drawings. Although the present invention will be described as to a gun game (or shooting game) using a gun-type controller, it is not limited to such a game, but may be applied to any of various other games.

1. Configuration

Figure 1:
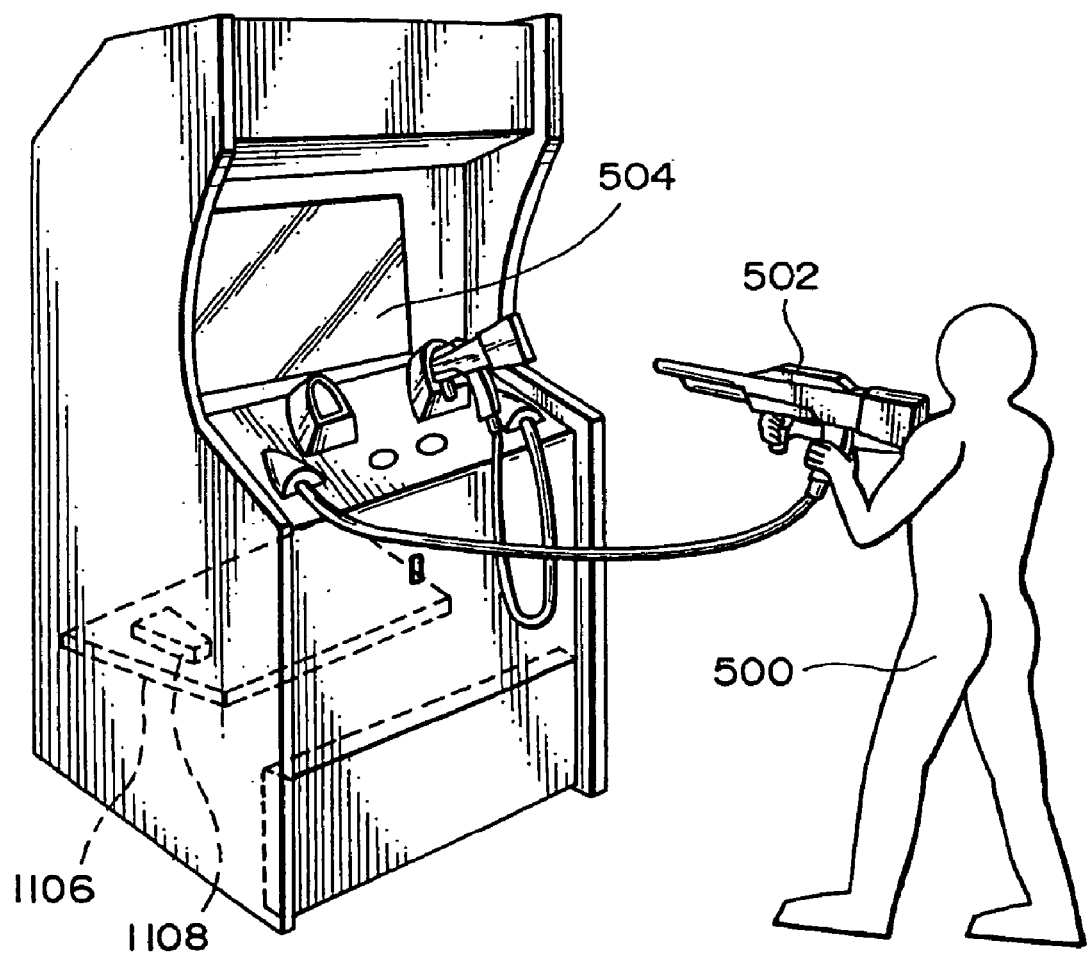
FIG. 1 shows an example of the configuration of an arcade game system to which the embodiment of the present invention is applied.

FIG. 1 shows an configuration of the present invention which is applied to an arcade game system.

A player 500 first holds a gun-type controller 502 (which is a shooting device in a broad sense) which is formed in the similitude of a real machine gun. The player 500 can enjoy the gun game by shooting target objects including enemy characters (which are objects in a broad sense) which are displayed on a screen 504.

Particularly, the gun-type controller 502 in this embodiment is designed to continuously expel virtual shots (bullets) at high speed when the controller 502 is triggered. Thus, the player can feel a virtual reality as if he or she really shoots the real machine gun.

The shot hitting position (or bullet reaching position) may be detected by a photosensor in the gun-type controller 502 for sensing a scan ray on the screen or by a CCD camera or the like which can sense a light ray (or laser beam) emitted from the gun-type controller 502.

Figure 2:
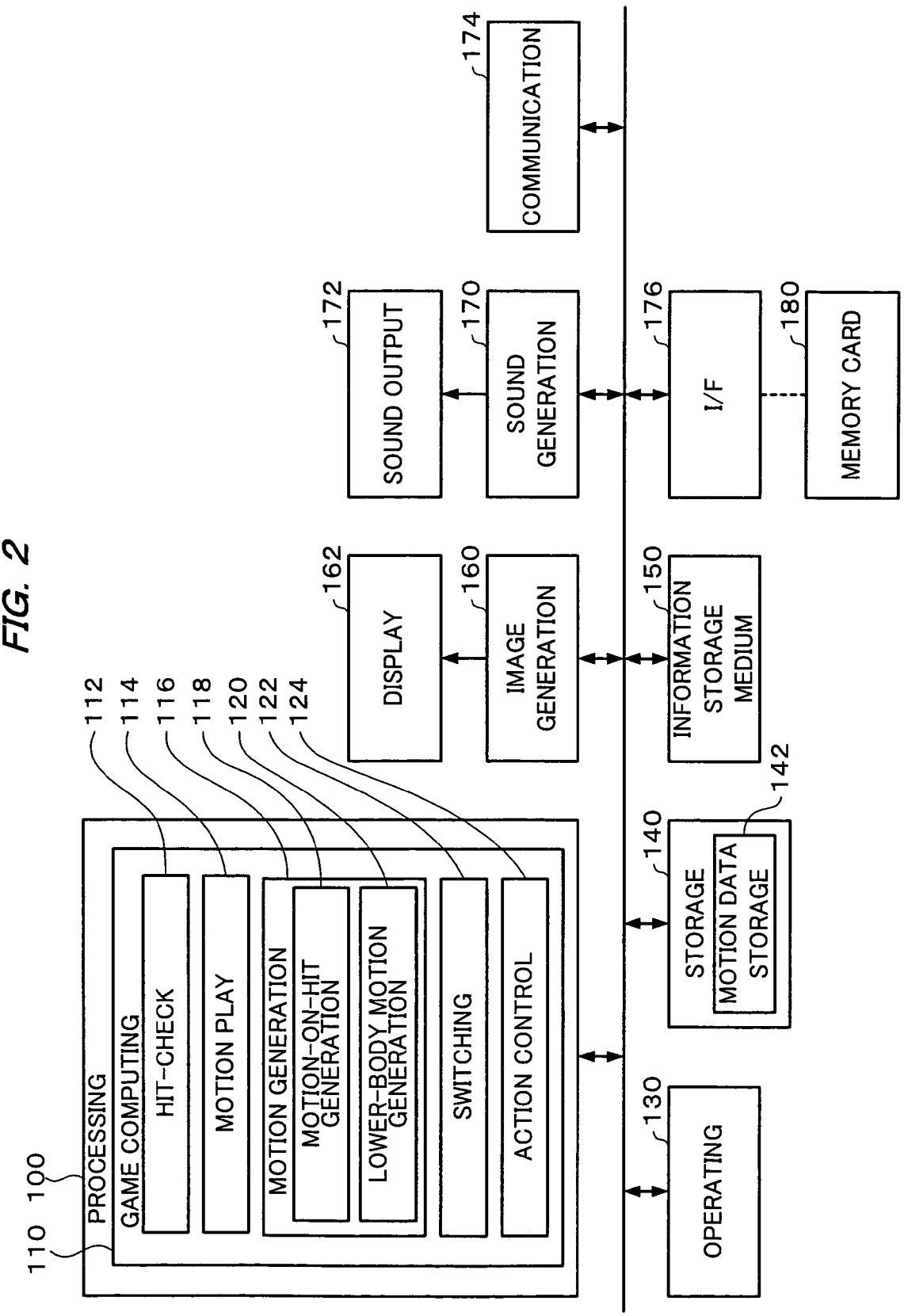
FIG. 2 is a block diagram of an image generation system according to the embodiment of the present invention.

FIG. 2 is a block diagram of one embodiment of the present invention. In this figure, this embodiment may essentially include at least a processing section 100 (or a set of the processing section 100 and a storage section 140 or a set of the processing section 100, the storage section 140 and an information storage medium 150). Each of the other blocks (e.g., a operating section 130, an image generation section 160, a display section 162, a sound generation section 170, a sound output section 172, a communication section 174, an I/F section 176, a memory card 180 and so on) may take any component.

The processing section 100 performs various processings for control of the entire system, commands to the respective blocks in the system, game computation and so on. The function thereof may be implemented by any suitable hardware means such as CPU (CISC type, RISC type), DSP or ASIC (or gate array or the like) or a given program (or game program).

The operating section 130 is used to input operational data from the player and the function thereof may be implemented by any hardware means such as the gun-type controller 502 of FIG. 1, levers, and buttons.

The storage section 140 provides a working area for the processing section 100, image generation section 160, sound generation section 170, communication section 174, I/F section 176 and others. The function thereof may be implemented by any suitable hardware means such as RAM or the like.

The information storage medium (which may be a computer-readable storage medium) 150 stores information including programs, data and others. The function thereof may be implemented by any suitable hardware means such as optical memory disk (CD or DVD), magneto-optical disk (MO), magnetic disk, hard disk, magnetic tape, semiconductor memory (ROM) or the like. The processing section 100 performs various processings in the present invention (or this embodiment) based on the information that has been stored in this information storage medium 150. In other words, the information storage medium 150 stores various types of information (or programs and data) for implementing (or executing) the means of the present invention (or this embodiment) which is particularly represented by the block included in the processing section 100.

Part or the whole of the information stored in the information storage medium 150 will be transferred to the storage section 140 when the system is initially powered on. The information stored in the information storage medium 150 may contain at least one of program code set for processing the present invention, image information, sound information, shape information of objects to be displayed, table data, list data, player information, command information for the processings in the present invention, information for performing the processings according to the commands and so on.

The image generation section 160 generates and outputs various images toward the display section 162 according to instructions from the processing section 100. The function thereof may be implemented by any suitable hardware means such as image generation ASIC, CPU or DSP or according to a given program (or image generation program) or based on image information.

The sound generation section 170 generates and outputs various sounds toward the sound output section 172 according to instructions from the processing section 100. The function thereof may be implemented by any suitable hardware means such as sound generation ASIC, CPU or DSP or according to a given program (or sound generation program) or based on sound information (waveform data and the like).

The communication section 174 performs various controls for communication between the game system and any external device (e.g., host machine or other image generation system). The function thereof may be implemented by any suitable hardware means such as communication ASIS or CPU or according to a given program (or communication program).

Information for implementing the processings in the present invention (or this embodiment) may be delivered from an information storage medium included in a host machine (or server) to the information storage medium 150 through a network and the communication section 174. The use of such an information storage medium in the hose device (or server) falls in the scope of the invention.

Part or the whole of the function in the processing section 100 may be implemented by the function of the image generation section 160, sound generation section 170 or communication section 174. Alternatively, part or the whole of the function in the image generation section 160, sound generation section 170 or communication control section 174 may be implemented by the function of the processing section 100.

The I/F section 176 serves as an interface for information interchange between the game system and a memory card (or a portable information storage device including a portable game machine in a broad sense) 180 according to instructions from the processing section 100. The function thereof may be implemented by a slot into which the memory card is inserted, a data write/read controller IC or the like. If the information interchange between the game system and the memory card 180 is to be implemented in a wireless manner (e.g., through infra-red communication), the function of the I/F section 176 may be implemented by any suitable hardware means such as semiconductor laser, infra-red sensor or the like.

The processing section 100 further comprises a game computing section 110.

The game computing section 110 performs various processes such as coin (or charge) reception, setting of various modes, game proceeding, setting of scene selection, determination of the position and rotation angle (about X-, Y- or Z-axis) of an object, determination of the view point and visual line (direction), play (or generation) of the motion, arrangement of the object within the object space, hit checking, computation of the game results (or scores), processing for causing a plurality of players to play in a common game space, various game computations including game-over and other processes, based on operational data from the operating section 130 and according to the data and game program from the memory card 180.

The game computing section 110 comprises a hit check section 112, a motion play (replay) section 114, a motion generation section 116, a switching section 122 and an action control section 124.

The hit check section 112 performs a hit check process for checking whether or not a virtual shot emitted by the player through the gun-type controller hits an object. In order to reduce the processing load, it is desirable to perform the hit check process using an simplified object which is obtained by simplifying the shape of the object.

The motion play section 114 plays (replays) the motion of an object (which may be in the form of an computer object controlled by a computer, a player's object controlled by the player or the like) based on motion data which have been stored in a motion data storage section 142. More particularly, the motion data storage section 142 has stored the motion data including the positional and angular data for each of the parts in each of the reference motions of the object. The motion play section 114 reads this motion data and moves the parts of the object based on the motion data. Thus, the motion of the object is played (replayed).

The motion generation section 116 generates the motion of the object through a physical simulation (which is a simulation utilizing a physical calculation that may be of pseudo-type). In other words, this embodiment generates the motion of the object when subjected to a hit or the like, in real-time through the physical simulation, rather than the play of motion based on the motion data. In doing so, the present invention can provide a variable and realistic representation of motion while minimizing the amount of data to be used, in comparison with the play of motion based on the motion data.

The motion generation section 116 includes a motion-on-hit generation section 118 and a lower-body motion generation section 120.

The motion-on-hit generation section 118 generates the motion of an object when it is hit. More particularly, when the N-th part (region,portion) of the object is hit, the motion-on-hit generation section 118 moves the N-th part through the physical simulation based on hit information (or a force vector directed in the direction of hit) while at the same time it sequentially transmits (or propagates) the hit information to the subsequent N+1-th, N+2-th, N+3-th and other parts. At this time, the magnitude of the hit information may sequentially be attenuated on transmission, for example. The N+1-th, N+2-th, N+3-th and other parts will be moved through the physical simulation based on the transmitted hit information. When the motion of object is generated in such a manner, the realistic motion of the object can be represented with less processing load even if the object is continuously hit.

The lower-body motion generation section 120 generates the motion of the lower object body using a special algorithm for realistically representing the tottering behavior of the object when hit. More particularly, the object is moved to be tumbled down about its first part (e.g., left foot) which is on the ground. A moving target position to which the second part (e.g., right foot) not on the ground is to be moved is then set at a position limiting the tottering behavior of the object (e.g., a position in point symmetry with a position at which the virtual center of gravity is projected onto the ground). The second part is then moved to this moving target position. If the motion of the object is generated in such a manner, the motion of the object can be represented such that the object is hardly tumbled while tottering.

The switching section 122 switches the play of motion to the generation of motion, for example, when the object is hit. Alternatively, the switching section 122 performs the switching between the play of motion and the generation of motion if a given condition is satisfied (e.g., if a given time period has elapsed from hitting or if the physical strength of the object becomes zero). Thus, the motion of the object can be represented through the play of motion if it is difficult to generate the motion of the object. In a game scene in which a variable motion is required with less data, the motion of the object can be represented by the generation of motion.

The action control section 124 controls an action of the computer object manipulated by the computer. More particularly, it first determines whether or not any intervening object (which may be an obstruction or another enemy character) intervenes between a computer object (or enemy character) and a player's viewpoint (or an player's object controlled by the player). According to the determination, the action of the computer object is controlled. For example, such a control may include the prohibition (or restriction) of the action (or attack) of the computer object against the player or the movement of the computer object to a given moving target position (or a position at which the computer object can appropriately attack the player). Alternatively, if the intervening object is another computer object, the computer object may stand by until the another computer object is erased. In such a manner, there can be avoided such a situation that the player is affected by the action of the computer object passing through the intervening object.

The image generation system of this embodiment may be a dedicated single-player system in which only a single player can play a game or a multi-player system in which a plurality of players can play a game.

If a plurality of players play the game, the game images and sounds provided to the players may be generated by only a single terminal or by a plurality of terminals which are interconnected through a network (transmission line or communication line).

2. Features of this Embodiment

Figure 3:
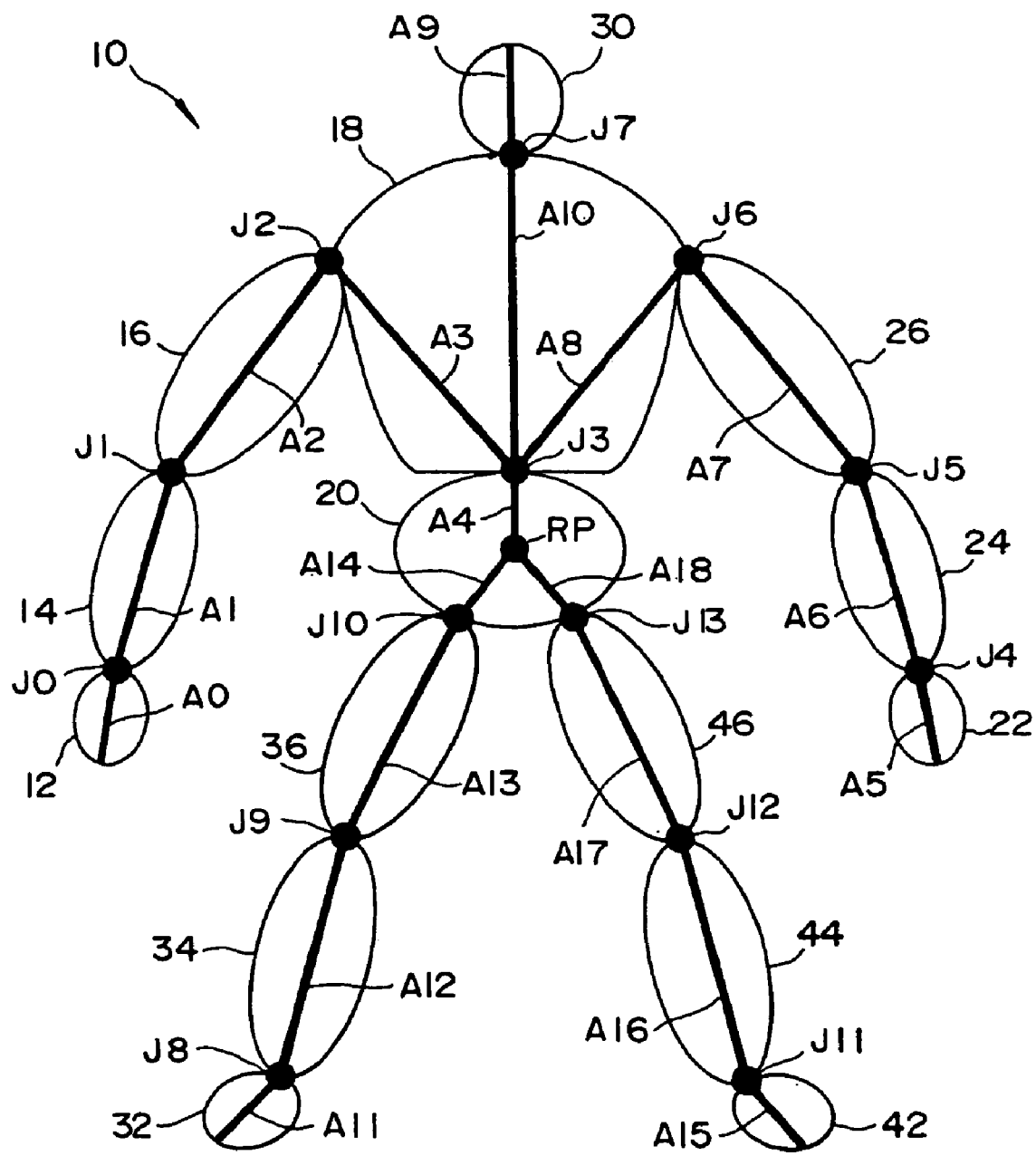
FIG. 3 illustrates an example of an enemy character (object) formed of a plurality of parts.

In this embodiment, as shown in FIG. 3, an enemy character (object) 10 is formed of a plurality of parts (which include right hand 12, right forearm 14, right upper arm 16, chest 18, hip 20, left hand 22, left forearm 24, left upper arm 26, head 30, right foot 32, right leg 34, right thigh 36, left foot 42, left leg 44 and left thigh 46). The positions and rotational angles (directions) of these parts (regions, portions) can be represented by the positions of joints J0–J13 and the rotational angles of bones (arcs) A0–A18, which joints and bones form a skeleton model. However, these bones and joints are virtual, but do not represent a really displayed object.

In this embodiment, the parts forming the enemy character are placed in a parent-child structure or a hierarchy structure (in fact, the joints are placed in the parent-child structure). More particularly, the parents for the hands 12 and 22 are the forearms 14 and 24. The parents for the forearms 14 and 24 are the upper arms 16 and 26, the parent of which is the chest 18. The parent for the chest 18 is the hip 20. The parent for the head 30 is also the chest 18. The parents for the feet 32 and 42 are the legs 34 and 44, the parents of which are the thighs 36 and 46. The parent for the thighs 36 and 46 is the hip 20.

A motion data storage section has stored the positions and rotational angles of these parts (joints and bones) as motion data. For example, it is now assumed that a walking motion is formed of reference motions MP0, MP1, MP2 . . . MPN. The position and rotational angle of the parts at each of these reference motions MP0, MP1, MP2 . . . MPN have previously been stored as motion data. Thus, the motion of the object can be played by sequentially reading the motion data relating to the reference motions MP0, MP1 and others with time.

The motion data stored in the motion data storage section 142 may generally be acquired by motion capturing or prepared by a designer. The positions and rotational angles of the parts (joints and bones) are represented relative to the positions and rotational angles of the parent parts.

The first feature of this embodiment is to generate the motion of the hit enemy character (object) through the physical simulation.

Figure 4:
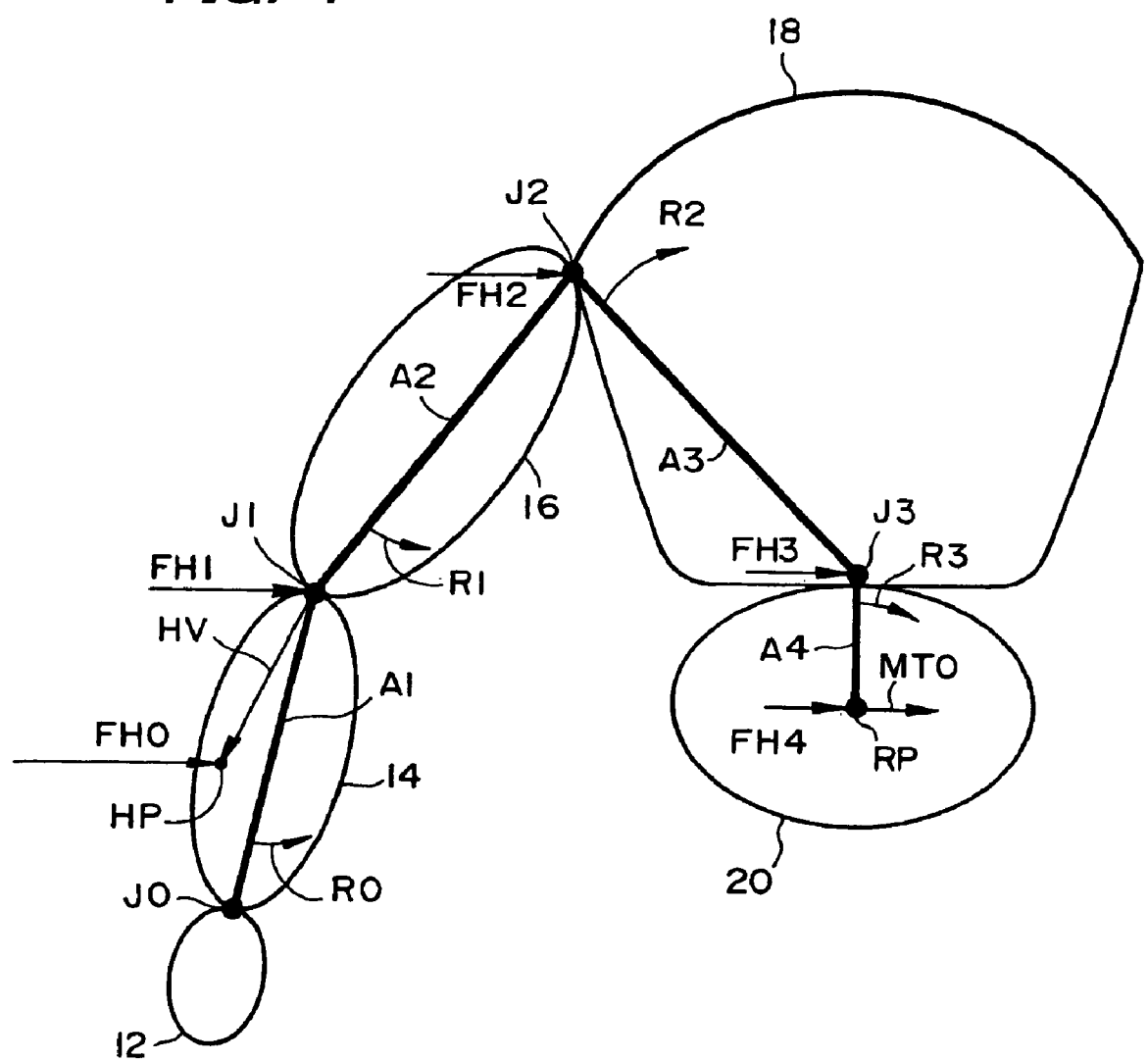
FIG. 4 illustrates a technique of generating a motion on hitting according to the present invention.

For example, when the forearm 14 of the enemy character is hit by a shot (bullet) from a player, the forearm 14 is first moved (rotated or traveled) based on a vector of hitting force FH0 (which is hit information in a broad sense), as shown in FIG. 4. This vector FH0 is further sequentially transmitted (propagated) to the upper arm 16, chest 18 and hip 20 which are parent parts for the forearm 14, as FH1, FH2, FH3 and FH4. The upper arm 16, chest 18 and hip 20 are then moved based on the vectors of hitting force FH1–FH4. In this embodiment, thus, the motion of the hit enemy character is generated in real-time.

More particularly, the vector of hitting force FH0 has its direction toward the hitting direction (direction of shot trajectory) and its magnitude representing the strength of the hit. A rotation moment is determined by taking the outer product between a vector HV and the hitting force vector FH0. The HV is a vector coupling between the joint J1 and the hitting position (or bullet reaching position) HP.

The angular acceleration of the forearm 14 is then calculated from this rotation moment and the virtual mass of the forearm 14. The calculated angular acceleration is used to calculate the angular velocity in the forearm 14. Thus, the forearm 14 is rotated at this angular velocity as shown by R0.

The vector of hitting force FH0 (or hit information) is transmitted to the upper arm 16 that is the parent part while its magnitude being attenuated to FH1. More particularly, FH1 acts on the joint J1 with its rotation moment rotating the upper arm 16 as shown by R1.

Subsequently, FH2 is transmitted to the chest 18 and acts on the joint j2, the rotation moment thereof rotating the chest 18 as shown by R2.

FH3 is then transmitted to the hip 20 and acts on the joint J3, the rotation moment thereof rotating the hip 20 as shown by R3. FH4 is also transmitted to the hip 20 and acts on a representative point RP to move the hip 20 as shown by MT0. As the hip 20 moves in the direction of MT0, the parts other than the hip 20 will also be moved in the direction of MT0. In this case, however, the positional relationship between the hip 20 and the other parts will not be changed.

According to the aforementioned technique, the realistic motion of the enemy character when hit can be generated. The generated motion depends on the position, direction and magnitude of hitting. This can highly increase variations of motion, compared with the play of motion based on the motion data.

According to this embodiment, the play of motion based on the motion data is switched to the generation of motion through the physical simulation when the enemy character is hit.

Figure 5A:
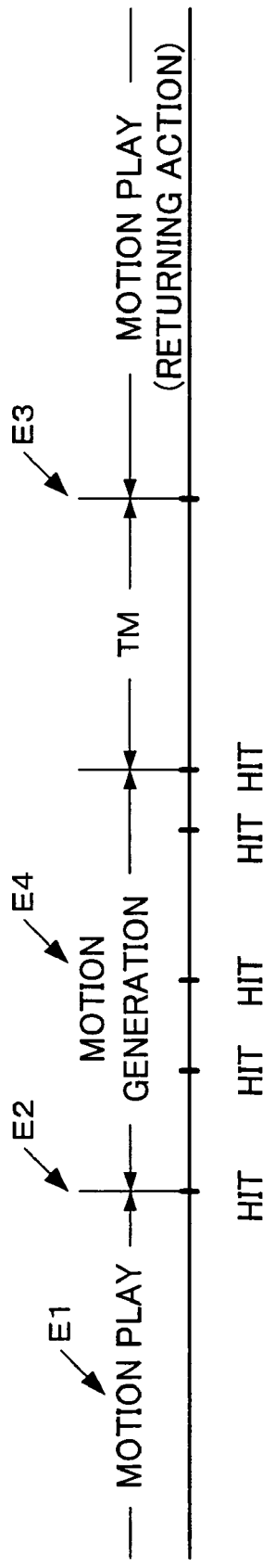
FIGS. 5A and 5B illustrate a technique of switching between the motion generation and the motion play.

As shown by E1 in FIG. 5A, for example, the motion of the enemy character is represented by the play of motion based on the motion data before the enemy character is hit.

As the enemy character is hit, the play of motion is switched to the generation of motion, as shown by E2. In other words, the motion of the enemy character when hit is represented by such a technique of generating the motion as described in connection with FIG. 4.

If a given condition is satisfied, this embodiment then switches the generation of motion through the physical simulation into the play of motion based on the motion data. As shown by E3 in FIG. 5A, for example, the generation of motion may be switched to the play of motion since a given time period TM has elapsed after hitting.

In other words, if the enemy character has continuously been hit by shots for a brief time period as shown by E4, the enemy character is moved through the generation of motion as described in FIG. 4. This can represent the enemy character having its finely changed motions depending on the position and direction of hitting.

On the other hand, if a given time period TM elapses after the enemy character has been hit by a shot, it is determined that the enemy character is no longer continuously hit by shots. In such a case, therefore, the enemy character is caused to perform an action returning to its original position.

Figure 5B:
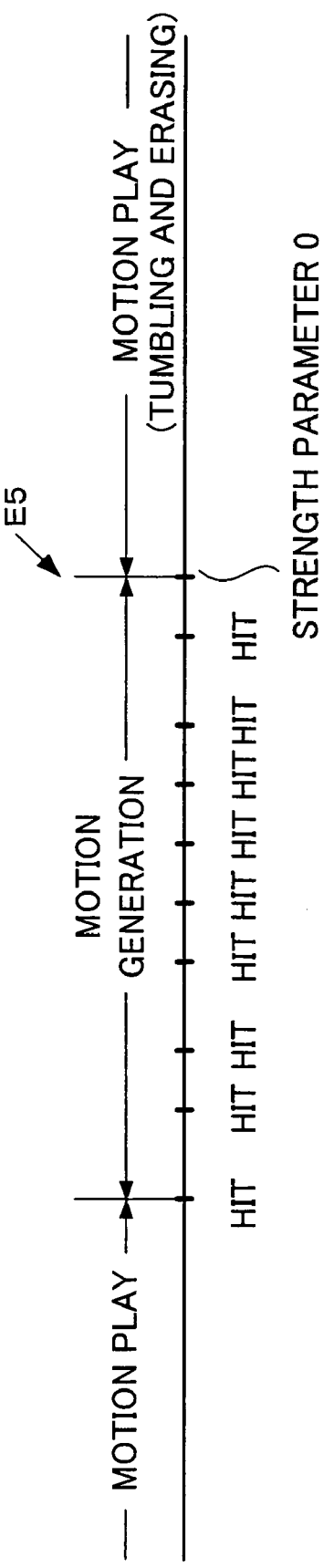

At E5 in FIG. 5B, the generation of motion is switched to the play of motion since the strength parameter of the enemy character becomes zero (or a given value). In such a case, the motion of the enemy character is played such that it is completely tumbled and erased.

In order to represent the staggering motion of the enemy character when hit, this embodiment generates the motion of the lower body of the enemy character using a special algorithm. More particularly, the motion of the enemy character is generated such that the enemy character (or object) is moved and tumbled about its foot (or first part) on the ground. At the same time, the other foot (or second part) not on the ground is moved to a position at which the tumbling of the enemy character is restricted.

At G1 in FIG. 6, for example, the left foot 50 is on the ground while the right foot 52 is not on the ground. In such a case, as shown by FD0, the lower body of the enemy character is moved such that the enemy character is tumbled or tilted about the left foot 50 on the ground. Furthermore, the right foot 52 of the enemy character not on the ground is moved to a moving target position (transit support position) 54 at which the tumbling of the enemy character is restricted.

As shown by G2 in FIG. 6, when both the feet 50, 52 are placed on the ground, the left foot 50 remote from the hip 60 is first lifted. As shown by FD1 in G3, the lower body of the enemy character is then moved such that the enemy character is tumbled about the right foot 52 on the ground. At the same time, the lifted left foot 50 is then moved to a moving target position 56 at which the tumbling of the enemy character is restricted. Thus, both the feet 50 and 52 will be placed on the ground.

In such a manner, the motion of the enemy character staggered or backward forced by continuous hits can realistically be represented.

When the enemy character is hit and if the motion thereof is generated by the aforementioned technique of FIG. 4, there occurs such a situation that the enemy character is standing on the floor (or ground) with its unnatural posture at which the enemy character is unbalanced due to shot hitting. For example, if only the right foot of the enemy character is hit, the enemy character may be standing on the floor with the right foot being only lifted.

Such a situation can be avoided when the lower body of the enemy character is moved by the technique of FIG. 6 through a special algorithm. If only the right foot 52 is lifted as shown by G1 in FIG. 6, the enemy character is moved and tumbled as shown by FD0 while the right foot 52 thereof is moved to the moving target position 54 at which the tumbling of the enemy character is restricted. This prevents the situation in which only the right foot 52 of the enemy character is held lifted for a long time. At the same time, the enemy character can be represented such that it is backed by the hitting impact.

Particularly, if the enemy character is continuously hit by shots, it can be represented such that the enemy character is gradually been backed by the continuous shot hitting. This can generate such a realistic motion that would not be attained by the prior art. In addition, the foot of the enemy character not on the ground will always be moved to such a position in which the tumbling of the enemy character is prevented. Therefore, the enemy character will not be tumbled unless the strength parameter thereof becomes zero. This provides a representation of motion which is optimum for the gun game in which bullets are continuously shot as in the machine gun.

However, it has been found that the following problem is raised when the motion of the enemy character is generated in real time through the aforementioned technique.

It is now assumed, for example, that an enemy character (or computer object) C1 is hit by an attack (shot) from a player's character (or player's object) controlled by the player, as shown in FIG. 7A. In this case, the motion of the enemy character C1 on hitting will be generated through the technique described in connection with FIG. 4. The hit enemy character C1 will move in any direction while staggering, according to the lower-body algorithm described in connection with FIG. 6.

It is also assumed, for example, that the enemy character C1 hides behind an obstruction OB as shown in FIG. 7B. If the enemy character C1 attacks the player's character P in such a state, the player (or player's character P) may be hit by a shot (or attack) penetrating through the obstruction OB. In other words, the attack from the enemy character C1 may be added to the player without blocking of the obstruction OB.

Figure 8A:
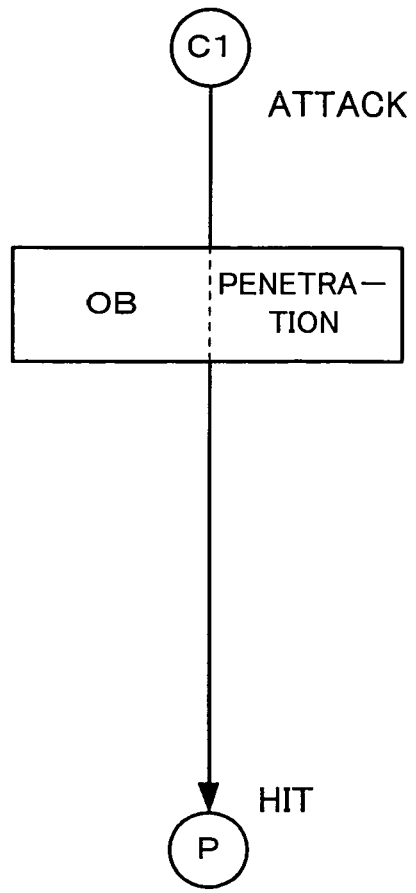
FIGS. 8A and 8B illustrate such a trouble that a player is attacked by an enemy character passing through an obstruction or other enemy character.
Figure 8B:
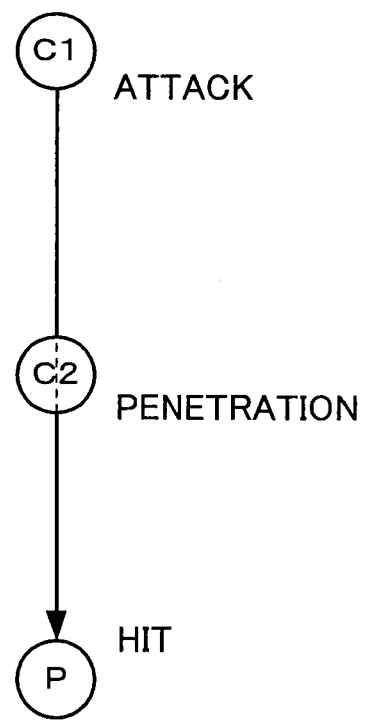

If the enemy character C1 moves behind another enemy character C2 as shown in FIG. 8B, a shot from the enemy character C1 hits the player (or player's character P) penetrating through the other enemy character C2.

When such situations as shown in FIGS. 8A and 8B occur, the player will feel a large unpleasantness because the player will suddenly be hit by a shot from the enemy character C1 located at a position invisible for the player penetrating through the obstruction OB or other enemy character C2.

In order to avoid such problems shown in FIGS. 8A and 8B, this embodiment of the present invention takes the following techniques.

It is first determined whether or not any obstruction (or intervening object) intervenes between an enemy character and a player's viewpoint (or player's character).

More particularly, a line connecting between the enemy character C1 and the viewpoint VP (or player's character P) is determined, as shown by H1 in FIG. 9. This is attained by emitting a light ray from the enemy character C1 toward the viewpoint VP. It is then determined whether or not the obstruction OB exists on that line.

According to the determination, the action of the enemy character is controlled such that the attack (or action) of the enemy character will not be applied to the player.

More particularly, first, the attack of the enemy character C1 against the player (or player's character P) is prohibited or restricted, as shown by H2 in FIG. 9. An optimum moving target position for the attack is then selected from previously provided positions P1, P2, P3 and P4. At H2 in FIG. 9, P4 has been selected. The enemy character C1 is then moved to the selected moving target position P4, as shown by H3 in FIG. 9. If it is determined that the attack is possible, the enemy character C1 begins to attack the player, as shown by H4.

FIGS. 10A–12B illustrate game images generated according to this embodiment of the present invention.

Figure 10A:
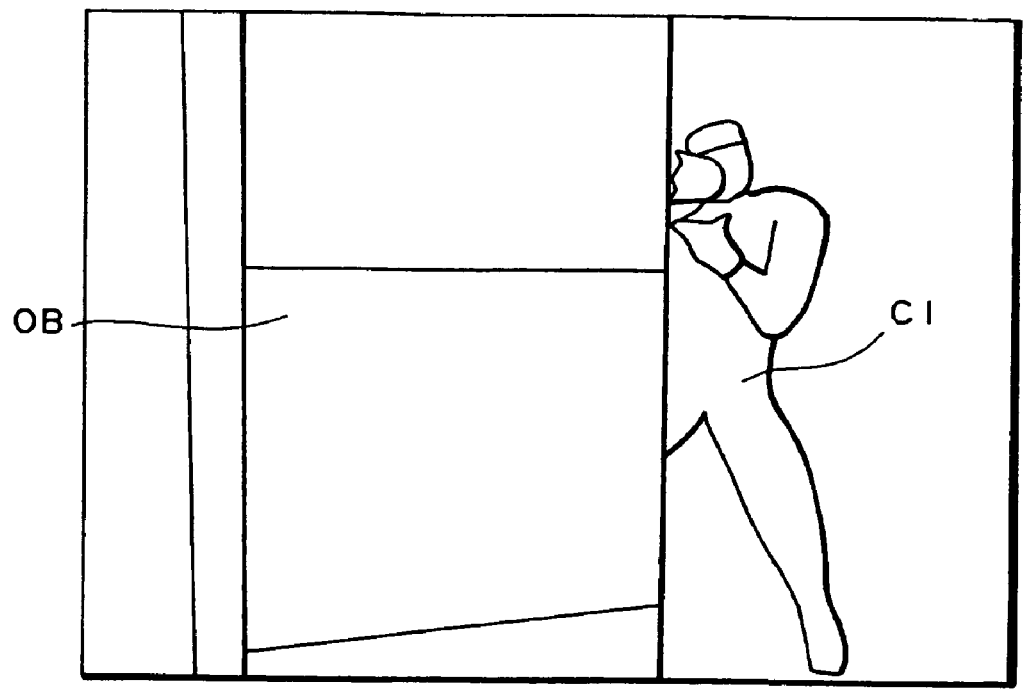
FIGS. 10A and 10B show game images generated according to the embodiment of the present invention.
Figure 10B:
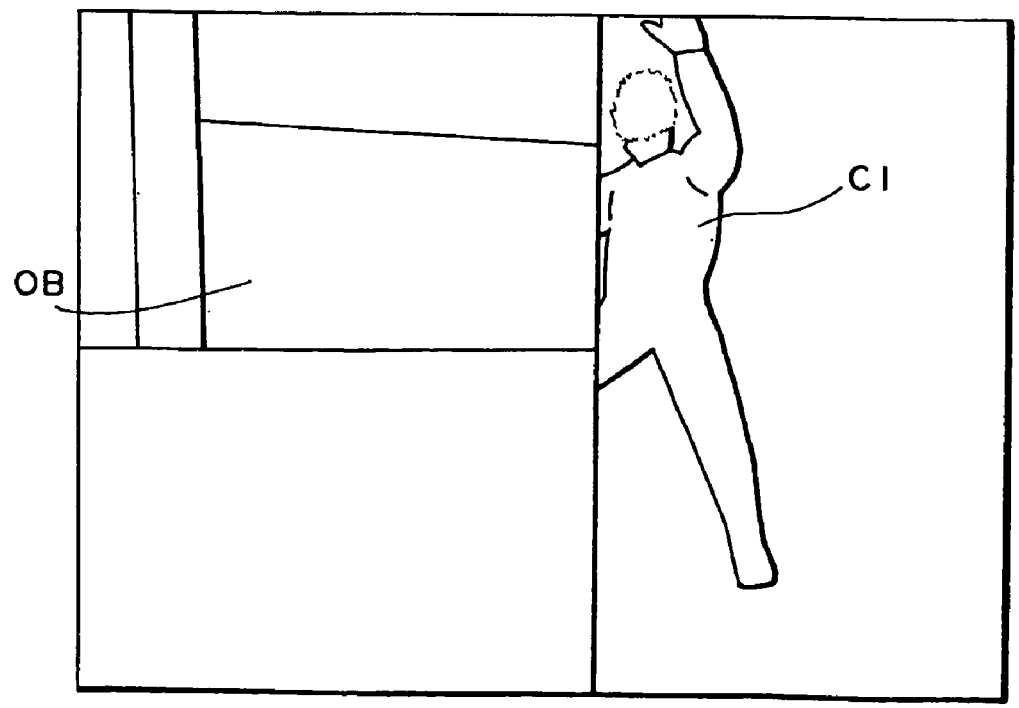

FIG. 10A shows a game scene in which the enemy character C1 is hit by a shot from the player. At this time, the motion of the hit enemy character C1 is generated through the technique described in connection with FIG. 4. According to the lower-body action algorithm described in connection with FIG. 6, the enemy character C1 will move while staggering due to the hitting impact, as shown in FIG. 10B.

Figure 11A:
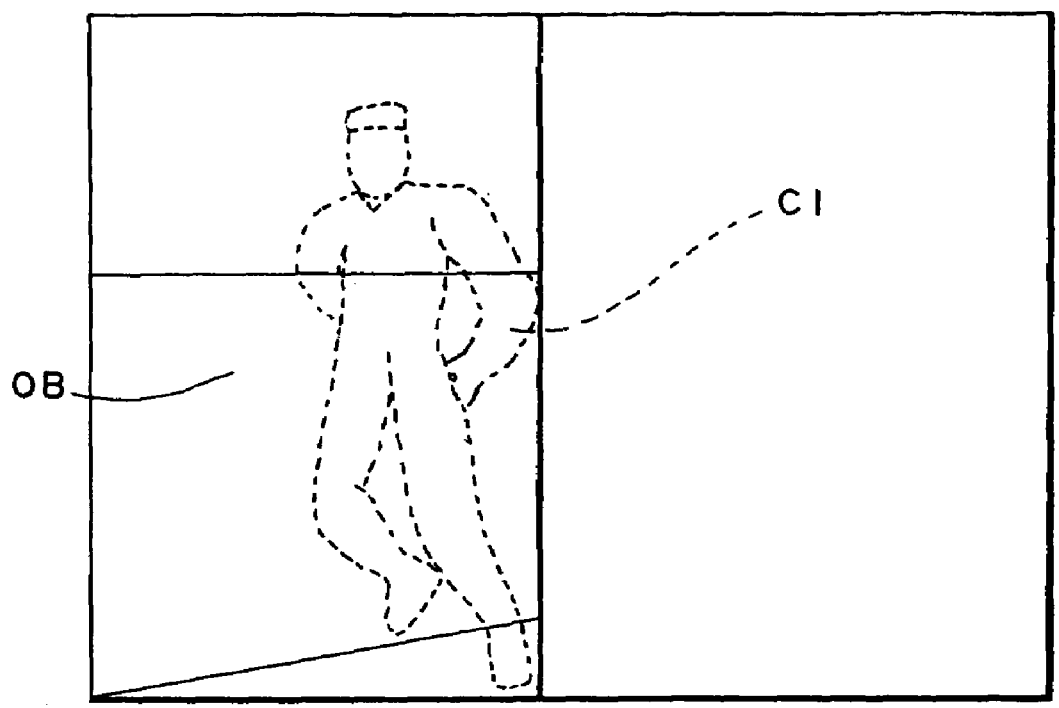
FIGS. 11A and 11B also show game images generated according to the embodiment of the present invention.

FIG. 11A shows another game scene in which the enemy character C1 moved due to the hitting impact hides behind the obstruction OB. In this case, there may occur such a problem that when the enemy character C1 counterattacks the player, a shot from the enemy character C1 may hit the player penetrating through the obstruction OB.

Figure 11B:
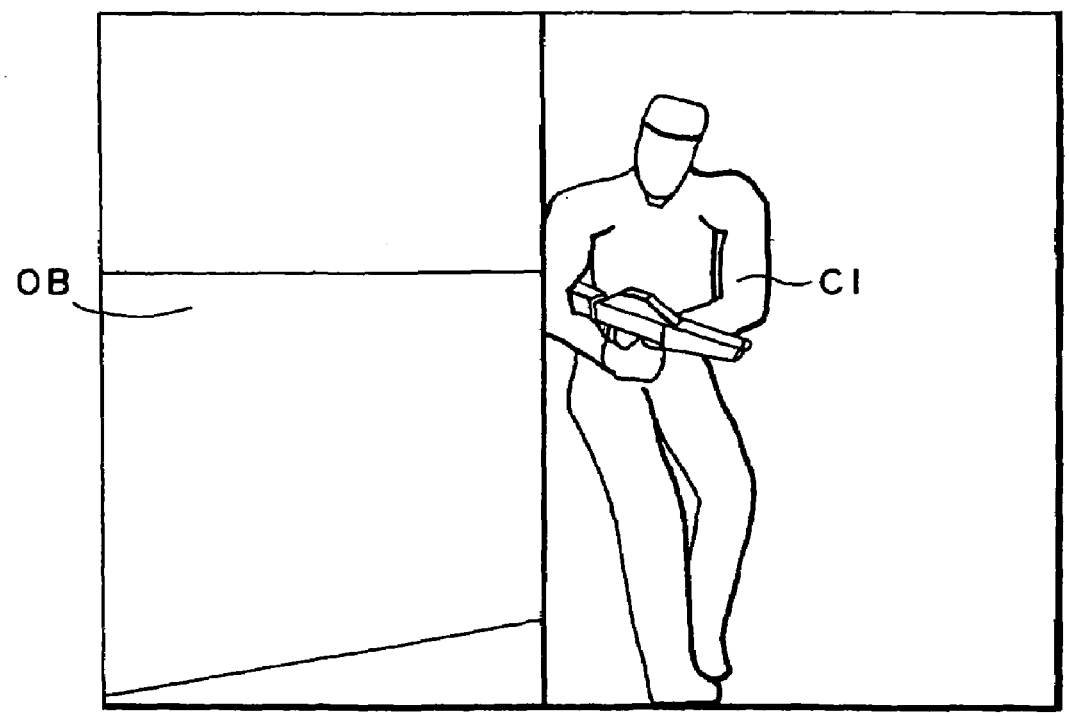

In such a case, however, this embodiment prohibits the counterattack from the enemy character C1, as described in connection with FIG. 9 at H2. The enemy character C1 moves to an appropriate moving target position, as described in connection with FIG. 9 at H3. FIG. 11B shows another game scene in which the enemy character C1 has moved to the appropriate moving target position.

Figure 12A:
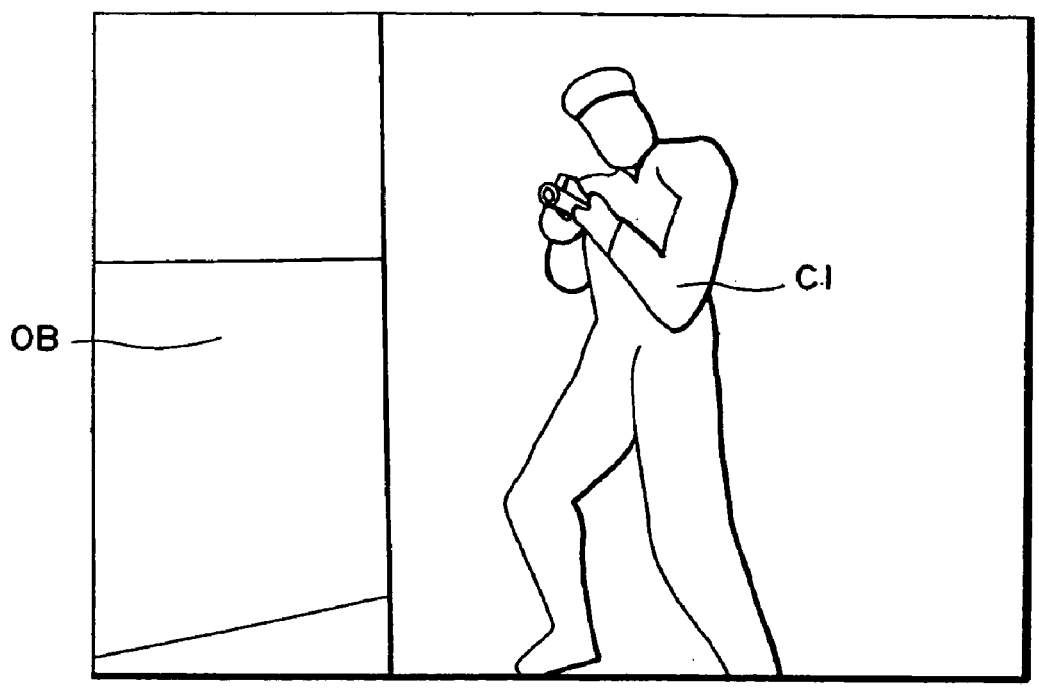
FIGS. 12A and 12B also show game images generated according to the embodiment of the present invention.
Figure 12B:
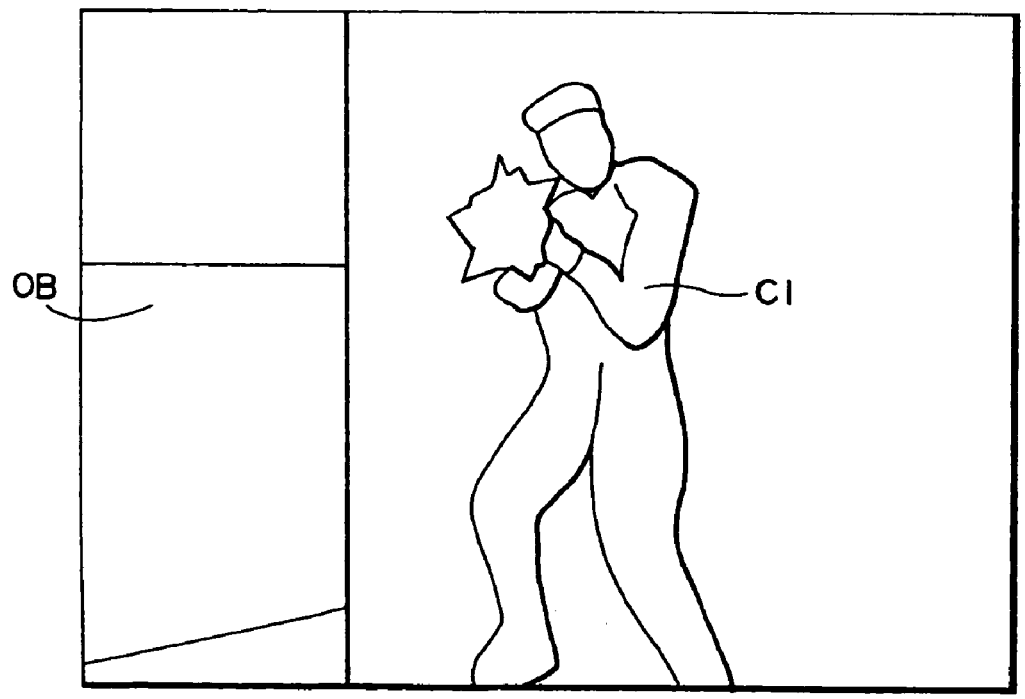

After moved to the appropriate moving target position, the enemy character C1 holds a machine gun as shown in FIG. 12A and then begins to attack (or counterattack) the player as shown in FIG. 12B.

When the action of the enemy character is controlled by the aforementioned technique, the problem shown in FIGS. 8A and 8B in which the player will be hit by a shot from the enemy character passing through the obstruction or other enemy character can be overcome.

The problem of FIGS. 8A and 8B may be overcome to some degree by another technique of modifying the position of the enemy character or the route through which the enemy character moves.

However, such a technique restricts the design relating to the position of the enemy character or the route through which the enemy character moves. This will prevent the game stage from being freely designed.

As described in connection with FIGS. 4 and 6, this embodiment generates the motion of the enemy character in real time. Thus, it cannot be expected how the enemy character moves. In other words, the moving position and motion of the enemy character will vary depending on the player's operation in game (or which enemy character and what timing the player shoots). Even though the initial position and moving route of the enemy character is properly modified, it naturally occurs that the enemy character hides behind an obstruction as shown in FIG. 7B.

However, this embodiment controls the action of the enemy character by modifying the action algorithm thereof, as shown in FIG. 9. Even if such a situation as shown in FIG. 7B occurs, this embodiment can effectively avoid the problem of FIGS. 8A and 8B in which the player is hit by a shot passing through the obstruction or other enemy character.

If a hit-check between the shot from the enemy character C1 and the obstruction OB or other enemy character is perform such that the shot from the enemy character C1 will not pass through the obstruction OB or other enemy character C2, the problem of FIGS. 8A and 8B can be overcome.

However, the game of such a type may have a great number of enemy characters and obstructions. The hit-check relating to these enemy characters and obstructions requires very heavy processing load.

The technique of the present invention shown in FIG. 9 can avoid the problem of FIGS. 8A and 8B even though all the hit-check relating to the enemy characters and obstructions is not performed (or even if the player is attacked by the enemy characters without blocking of the intervening objects). Thus, the problem of FIGS. 8A and 8B can be overcome without very increasing of the processing load.

According to this embodiment of the present invention, the first enemy character stands by if an intervening object intervening between the first enemy character and the viewpoint (or player's character) is the other or second enemy character.

Figure 13:
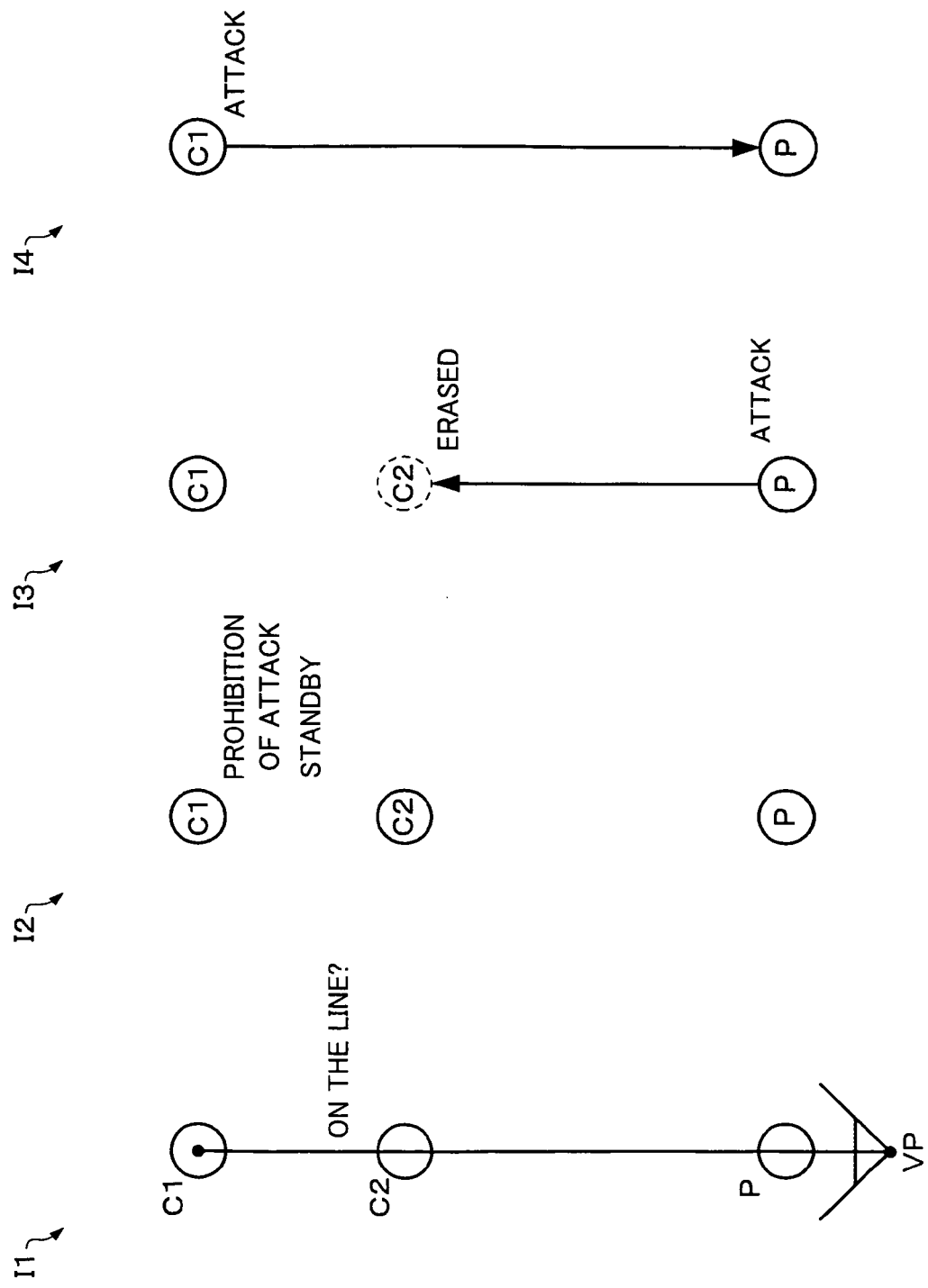
FIG. 13 illustrates a technique of making a first enemy character stand by when the first enemy character is behind a second enemy character.

More particularly, a line connecting the enemy character C1 to the viewpoint VP (or player's character P) is first determined, as shown in FIG. 13 at I1. It is then determined whether or not the other enemy character C2 is on that line.

When it is determined that the obstruction OB is on the line, the attack of the enemy character C1 is prohibited and the enemy character C1 is made to stand by, as shown in FIG. 13 at I2.

If the enemy character C2 has been erased by the attack of the player as shown in FIG. 13 at I3, the enemy character C1 can then attack the player as shown in FIG. 13 at I4.

If the enemy characters C1 and C2 overlie on each other as viewed from the player as shown in FIG. 13 at I1, there is a very high possibility that the enemy character C2 located before the enemy character C1 will be erased by the attack of the player. When the enemy character C2 has been erased, the problem of FIG. 8B will naturally be overcome. In such a case, therefore, it is not required to move the enemy character C1 as in FIG. 9. It is sufficient to cause the enemy character C1 to wait. If the enemy character C1 is not required to be moved, the processing load can be relieved.

Furthermore, this embodiment erase any enemy character when that enemy character has moved out of the player's view.

Figure 14:
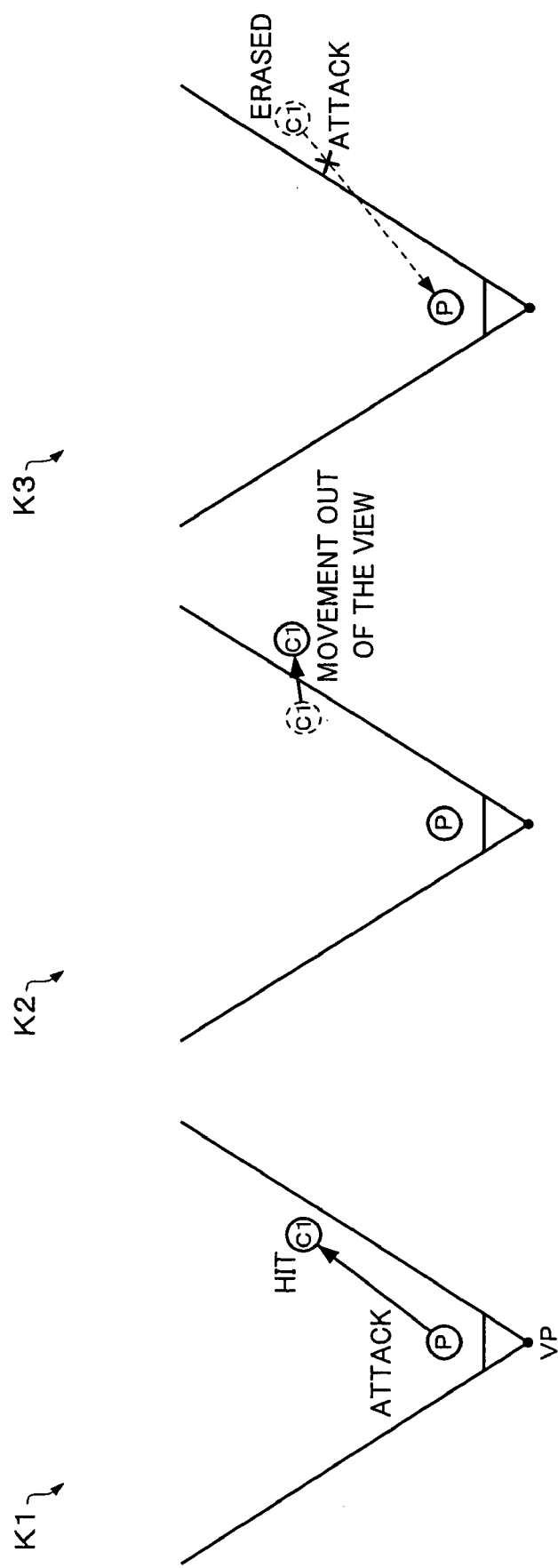
FIG. 14 illustrates a technique of erasing an enemy character after moving out of the player's view.

It is now assumed that the enemy character C1 is hit by the attack of the player as shown in FIG. 14 at K1 and that the enemy character C1 has moved out of the player's view (or out of the screen) as shown in FIG. 14 at K2. In such a case, this embodiment erase the enemy character C1 as shown in FIG. 14 at K3. Thus, such a situation that the enemy character C1 attacks the player from the out-of-view can effectively be avoided.

More particularly, this embodiment generates the motion of the enemy character in real time when it is hit, as described in connection with FIG. 4. The hit enemy character moves in any direction while being staggered by the hit impact, as described in connection with FIG. 6. Thus, the enemy character may be moved out of the player's view by the attack of the player. If the enemy character moved out of the player's view permits to attack the player, the player will be attacked by the invisible enemy character. This will give the unpleasant feel similar to those of FIGS. 8A and 8B to the player.

In order to avoid such a situation, this embodiment erase the enemy character C1 out of the player's view, as shown in FIG. 14 at K3. Thus, the player will not be attacked by the invisible enemy character. This can maintains the immersion of the player in the game.

3. Processing in this Embodiment

The details of this embodiment will be described with reference to the flowcharts of FIGS. 15 and 16.

Figure 15:
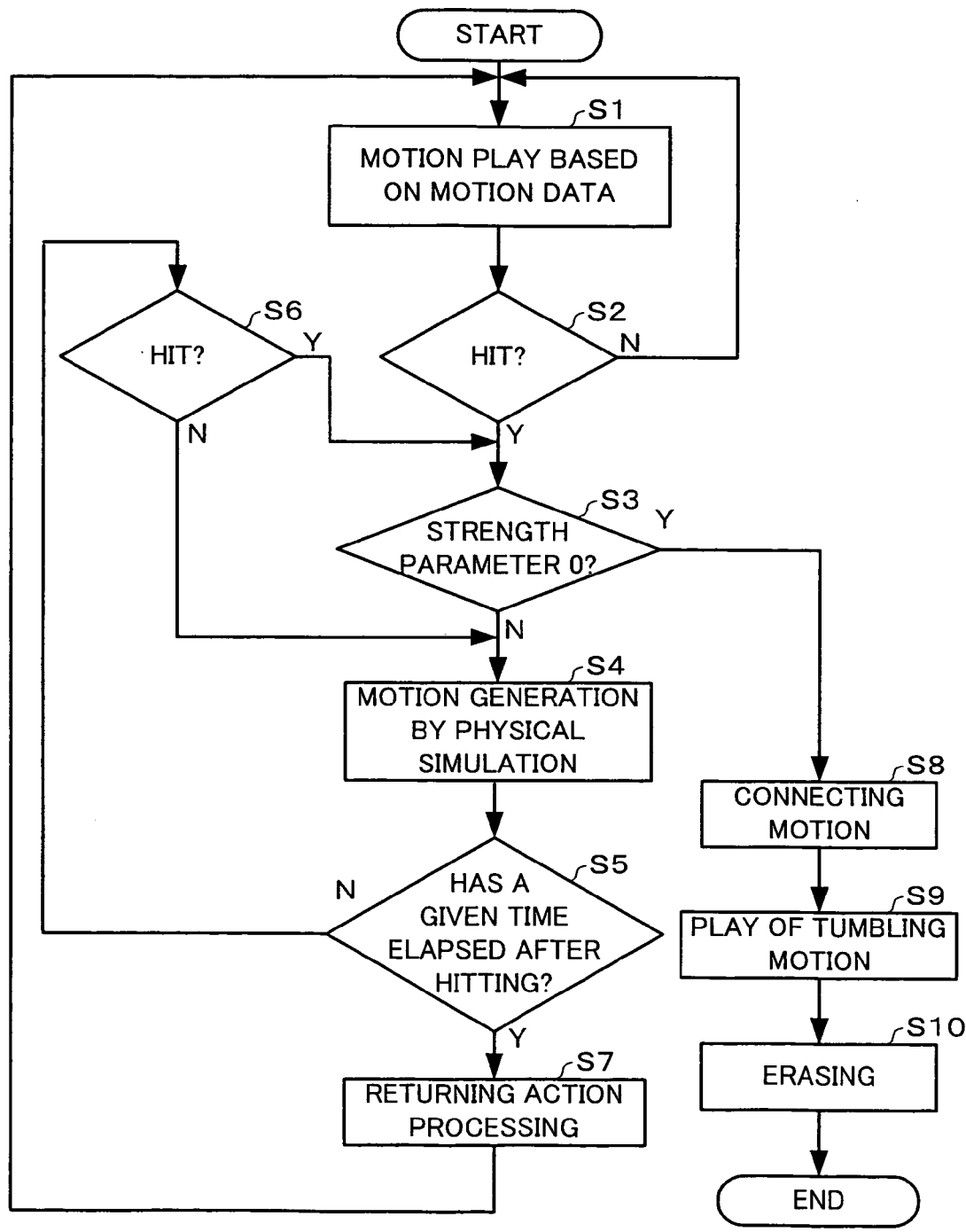
FIG. 15 is a flowchart illustrating a detailed example of processing according to the embodiment of the present invention.

The flowchart of FIG. 15 illustrates the flow of the whole process in this embodiment.

First of all, the play of motion is performed based on the motion data (step S1).

Next, it is determined whether or not an enemy character is hit by a shot from the player (step S2). If not so, the procedure returns to the step S1 wherein the play of motion is continued. If the enemy character is hit, it is then determined whether or not the strength parameter thereof is equal to zero (step S3). If not so, the procedure is shifted to the generation of motion through the physical simulation as shown in FIG. 5A at E2 (step S4).

It is then determined whether or not a given time period has elapsed after hitting (step S5). If not so, it is then determined whether or not the enemy character is hit by the shot from the player (step S6). If it is determined that the enemy character is hit by the shot from the player, it is then determined at the step S3 whether or not the strength parameter of the enemy character is equal to zero. If the enemy character is not hit by the shot from the player, the generation of motion at the step S4 is continued without determination relating to the strength parameter at the step S3.

If it is determined at the step S5 that a given time period has elapsed, the returning action processing of the enemy character is performed as described in connection with FIG. 9 (step S7). In other words, the enemy character is caused to perform the returning action from the motion on hit and the procedure is switched to the play of motion.

If it is determined at the step S3 that the strength parameter of the enemy character is equal to zero, a connection motion to the tumbling motion is played (or generated) (step S8). As shown in FIG. 5B at E5, the procedure shifts to the play of the tumbling motion (step S9) and the enemy character is erased (step S10).

Figure 16:
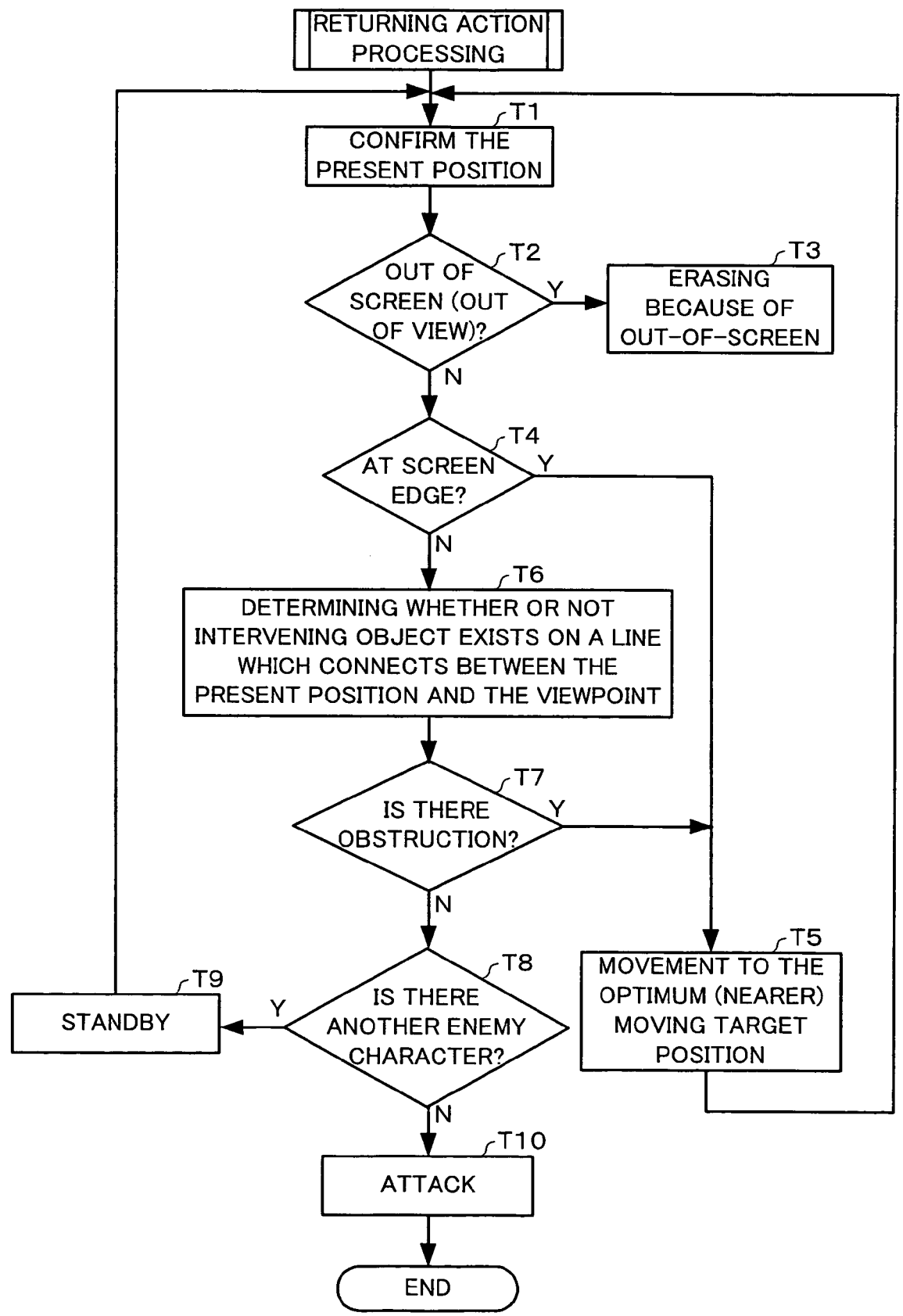
FIG. 16 is a flowchart illustrating another detailed example of processing according to the embodiment of the present invention.

The flowchart of FIG. 16 illustrates the returning action processing at the step S7 of FIG. 15 (or the action algorithm of the enemy character).

First of all, the present position of the player (or enemy character) is confirmed (step T1). It is then determined whether or not the present position is out of the screen (or out of the view) (step T2). If the present position is out of the screen, the player (or enemy character) is erased as described in connection with K3 of FIG. 14 (step T3).

It is then determined whether or not the present position is at the edge of the screen (step T4). If the present position is at the edge of the screen, the optimum moving target point is selected from a plurality of previously set points and the enemy character moves to that moving target point (step T5).

It is then determined whether or not any intervening object (obstruction or other enemy character) is on a line (ray) connecting between the present position and the viewpoint (step T6). If the obstruction is on that line as shown in FIG. 9 at H1, the enemy character moves to the optimum moving target point without attacking as shown in FIG. 9 at H2 and H3 (steps T7 and T5). If the other enemy character exists on the line as shown in FIG. 13 at I1, the enemy character stands by until the other enemy character is erased as shown in FIG. 13 at I2 and I3 (steps T8 and T9).

When no intervening object (obstruction or other enemy character) has been on the line, the enemy character begins to attack the player as shown in FIG. 9 at H4 and in FIG. 14 at I4 (step T10).

4. Hardware Configuration

Figure 17:
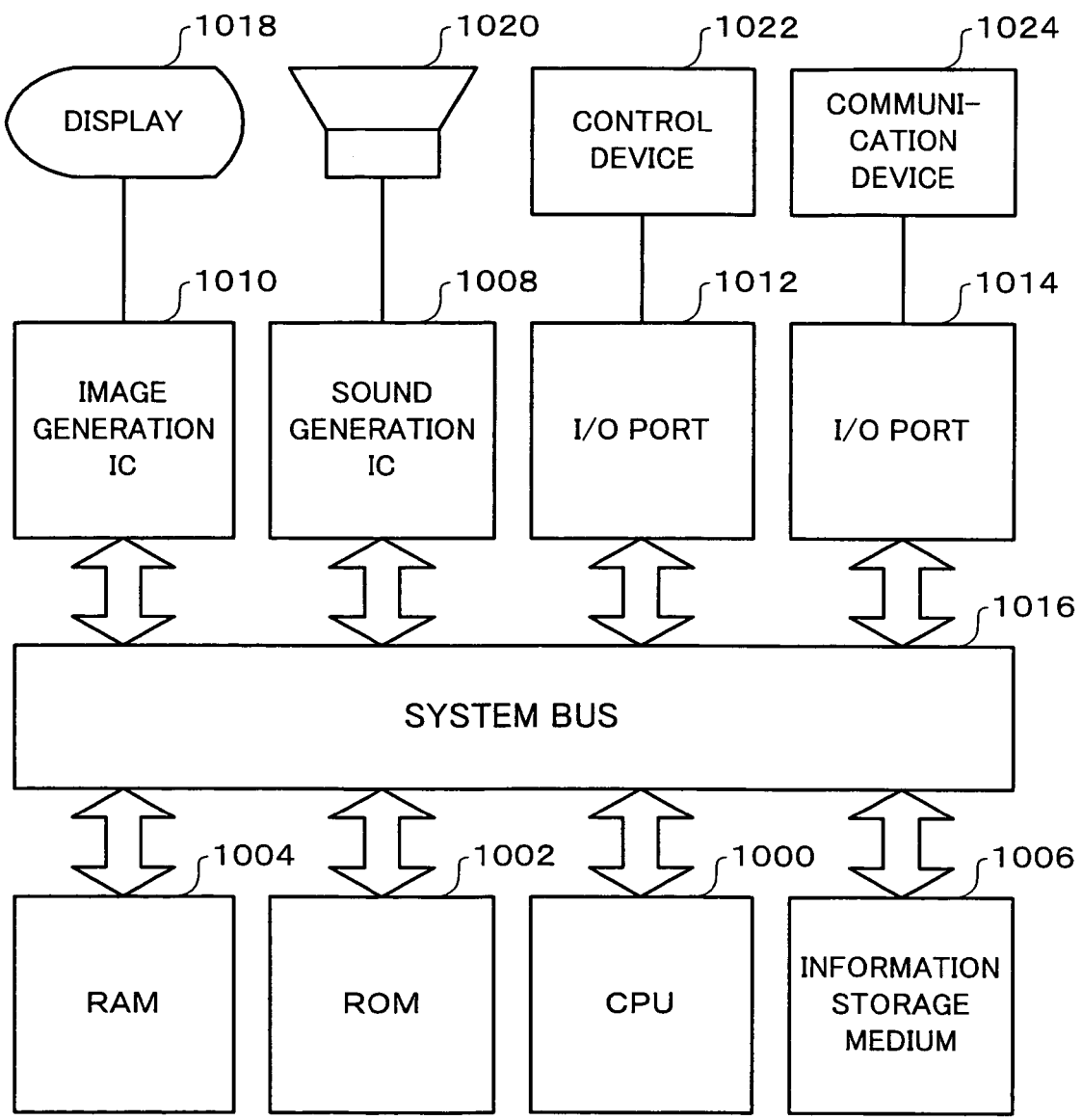
FIG. 17 shows an example of the configuration of hardware which can implement the embodiment of the present invention.

One hardware configuration capable of implementing this embodiment will now be described with reference to FIG. 17. The system shown in FIG. 17 comprises CPU 1000, ROM 1002, RAM 1004, an information storage medium 1006, a sound generation IC 1008, an image generation IC 1010 and I/O ports 1012, 1014, all of which are interconnected through a system bus 1016 for data reception and transmission. The image generation IC 1010 is connected to a display 1018; the sound generation IC 1008 to a speaker 1020; the I/O port 1012 to a control device 1022; and the I/O port 1014 to a communication device 1024.

The information storage medium 1006 has mainly stored a program, image data for representing objects, sound data and others. For example, a home game apparatus may use DVD, game cassette, CD-ROM or the like as an information storage medium for storing the game program and other data. An arcade game apparatus may use a memory such as ROM or the like. In the latter case, the information storage medium 1006 is in the form of ROM 1002.

The control device 1022 corresponds to a game controller, control panel or the like. The control device 1022 is used by the player for inputting his or her determination into the game system according to the progress of game.

CPU 1000 is to perform the control of the entire game system and the processing of various data according to the program stored in the information storage medium 1006, the system program (such as information for initializing the entire system) stored in the ROM 1002, input signals from the control device 1022 and so on. RAM 1004 is a memory means used as a working area for the CPU 1000 and has stored given contents in the information storage medium 1006 and ROM 1002 or the results of computation in the CPU 1000. The structures of data having a logical structure for implementing this embodiment may be build on this RAM or information storage medium.

The sound and image generation IC's 1008, 1010 in this game system are to output game sounds and images in a preferred manner. The sound generation IC 1008 is in the form of an integrated circuit for generating game sounds such as sound effects, background music and others, based on the information stored in the information storage medium 1006 and ROM 1002, the generated sounds being then outputted through the speaker 1020. The image generation IC 1010 is in the form of an integrated circuit which can generate pixel information to be outputted toward the display 1018 based on the image information from the RAM 1004, ROM 1002, information storage medium 1006 and so on. The display 1018 may be in the form of a so-called head mount display (HMD).

The communication device 1024 is to receive and transmit various types of information which are utilized in the game apparatus from and to external. The communication device 1024 is connected to the other game system (or systems) to transmit and receive given information corresponding to the game program from and to the other game systems or utilized to transmit and receive the information including the game program and other data through the communication line.

Various processing steps previously described in connection with FIGS. 1 to 16 are implemented by the information storage medium 1006 stored the information such as program, data and so on, and CPU 1000, image generation IC 1010 and sound generation IC 1008 which operate based on the information from the information storage medium 1006. The processings in the image generation IC 1010 and sound generation IC 1008 may be performed in a software manner through the CPU 1000 or all-purpose DSP.

When this embodiment is applied to such an arcade game system as shown in FIG. 1, a system board (or circuit board) 1106 included in the game system comprises CPU, image generation IC, sound generation IC and others all of which are mounted therein. The system board 1106 includes an information storage medium or semiconductor memory 1108 which has stored information for executing (or implementing) the processings of this embodiment (or means of the present invention). This information will be referred to "the stored information".

Figure 18A:
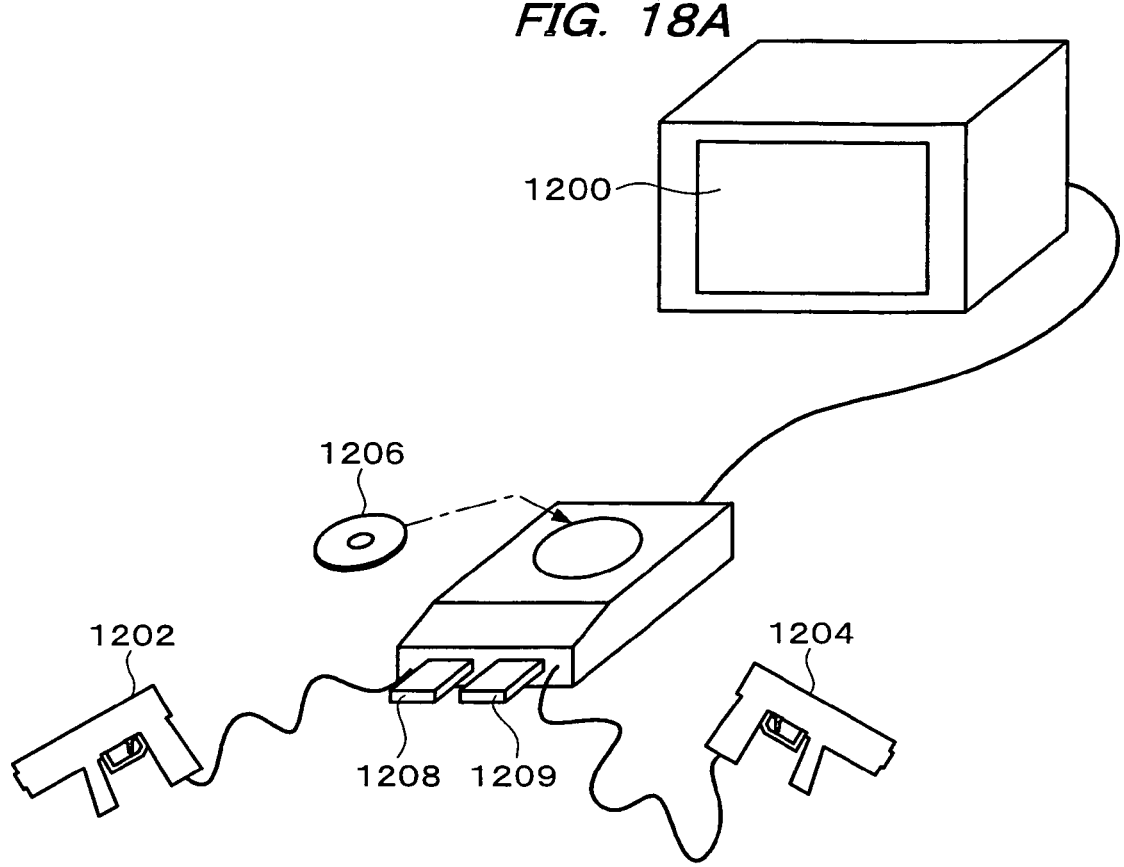
FIGS. 18A and 18B show various forms of the system to which the embodiment of the present invention is applied.

FIG. 18A shows a home game apparatus to which this embodiment is applied. A player enjoys a game by manipulating game controllers 1202 and 1204 while viewing a game picture displayed on a display 1200. In such a case, the aforementioned stored information is stored in DVD 1206 and memory cards 1208, 1209 which are detachable information storage media in the game system body.

Figure 18B:
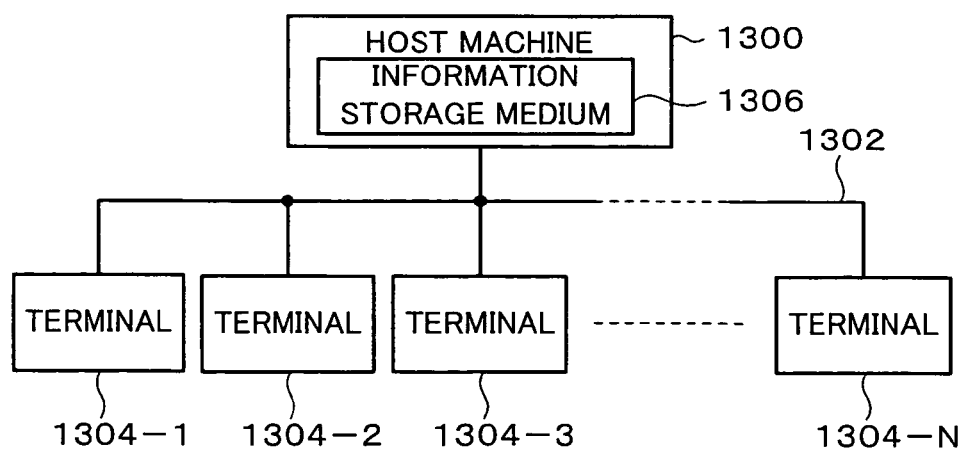

FIG. 18B shows an example wherein this embodiment is applied to a game system which includes a host machine 1300 and terminals 1304-1 to 1304-*n* connected to the host machine 1300 through a communication line (which is a small-scale network such as LAN or a global network such as INTERNET) 1302. In such a case, the above stored information is stored in an information storage medium 1306 such as magnetic disk device, magnetic tape device, semiconductor memory or the like which can be controlled by the host machine 1300, for example. If the terminals 1304-1 to 1304-*n* are designed each to have a CPU, image generation IC and sound processing IC and to generate game images and game sounds in a stand-alone manner, the host machine 1300 delivers game program and other data for generating game images and game sounds to the terminals 1304-1 to 1304-*n*. On the other hand, if the game images and sounds cannot be generated by the terminals in the stand-alone manner, the host machine 1300 will generate the game images and sounds which are in turn transmitted to the terminals 1304-1 to 1304-*n*.

In the configuration of FIG. 18B, the processings of the present invention may be decentralized into the host machine (or server) and terminals. The stored information for implementing the present invention may be divided for storing into the information storage media of the host machine (or server) and terminals.

Each of the terminals connected to the communication line may be either of home or arcade type. When the arcade game systems are connected to the communication line, it is desirable that each of the arcade game systems includes a portable information storage device (memory card or portable game machine) which can not only transmit the information between the arcade game systems but also transmit the information between the arcade game systems and the home game systems.

The present invention is not limited to the things described in connection with the above embodiment, but may be carried out in any of various other forms.

For example, the invention as defined in any depending claim may include only part of the components in any independent claim to which the depending claim belongs. The essential components in any independent claim of the present invention may be included in any other independent claim.

The intervening object in the present invention is not limited to such obstructions and enemy characters as described in connection with FIGS. 9 and 13, but may be any of various other forms such as player's character, moving bodies, map objects and so on.

The technique of controlling the action of the computer object is not limited to such techniques as described in connection with FIGS. 9, 13 and 14, but may be carried out by any of various other forms.

Although the present invention is particularly effective when the motion of the computer object is generated in real time through the physical simulation as in FIGS. 4 and 6, it may similarly be applied to a case where the motion of the computer object is not generated through the physical simulation.

In the aforementioned embodiment, the intervention of the intervening object is determined depending on whether or not it is on the line connecting between the computer object and the viewpoint. However, the present invention is not limited to such a technique of determination. The action of the computer object may be controlled without such a determination.

The moving target position of the computer object may be selected from a plurality of previously provided moving target positions, but may be generated in real time.

Figure 19A:
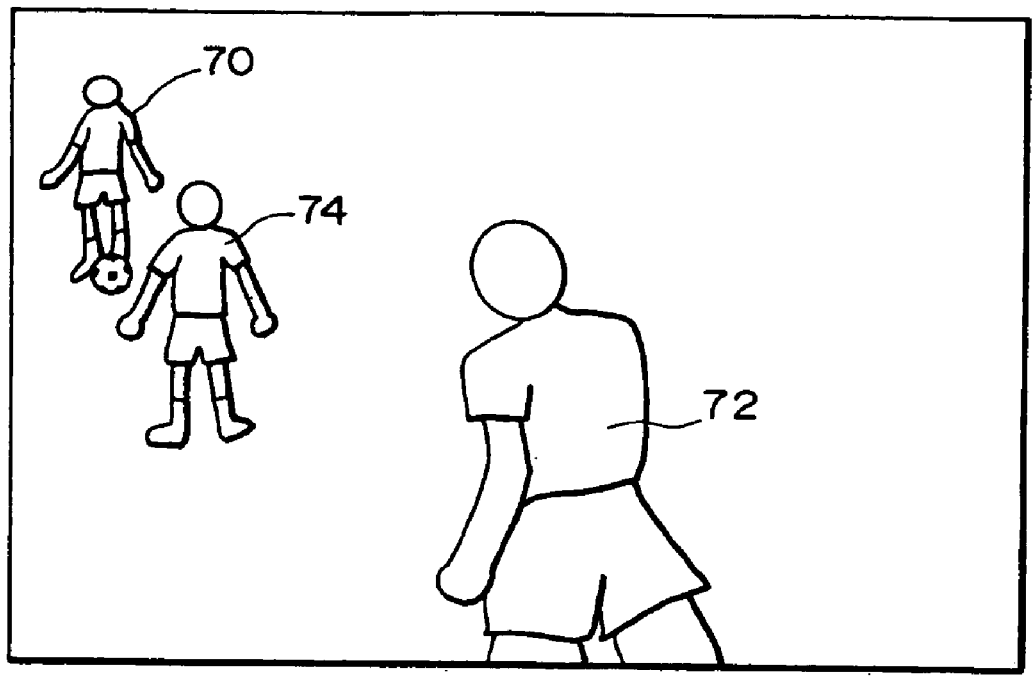
FIGS. 19A and 19B show game images in a soccer game to which the embodiment of present invention is applied.
Figure 19B:
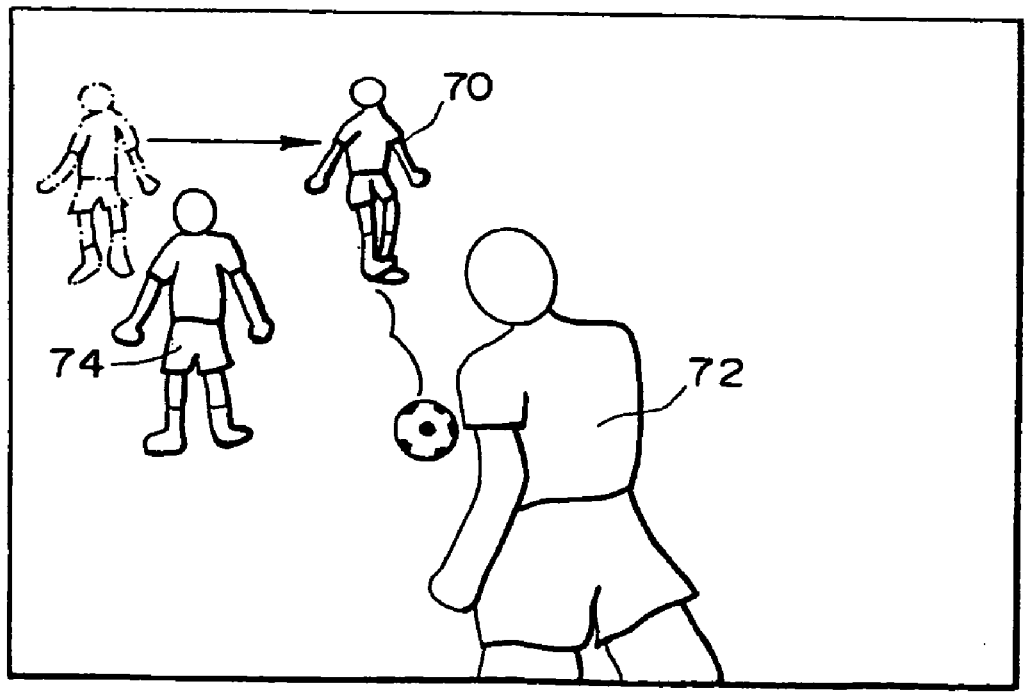

It is particularly desirable that the action of the computer object against the player is an attack action of the computer object. However, the present invention is not limited to such an attack action. For example, the action in the present invention may include various other actions other than the bullet shooting action, such as kicking, punching, passing, catching, bumping and so on. FIGS. 19A and 19B show a game scene in which the present invention is applied to a soccer game. In FIG. 19A, a player 70 (or computer object) is to pass (action) for another player 72 (or player's object).

However, since there is the third player 74 (or intervening object) between the players 70 and 72, the player 70 cannot pass for the player 72. In such a case, the action algorithm of the player 70 detects the intervention of the player 74 and causes the player 70 to move to a passable moving target position as shown in FIG. 19B. Thus, the player 70 will be able to pass for the player 72 or to perform the passing action.

Although it is also desirable the motion of the computer object is generated through the technique described in connection with FIG. 6, it may be generated through any of other techniques.

Although it is particularly desirable that the physical simulation for moving the parts is as described in connection with FIGS. 4 and 6, the present invention is not limited to such techniques, but may be carried out in any of various other forms. Although it is particularly desirable that the hit information is a vector of hitting force for simplicity, the present invention is not limited to such hit information. At least hit information for moving the parts is sufficient.

Although this embodiment has been described as to the generation and play of motion for the enemy character, the object to be subjected to the generation and play of motion is not limited to the enemy character, but may be in any of various other forms such as player's character, moving body and so on.

Although this embodiment has been described as to the object being hit by the shot, the present invention may use any of various other hitting forms such as sword hitting, punching, kicking and so on.

Other than the gun-type game, the present invention may similarly be applied to any of various other games such as other shooting games, fighting games, robot combat games, sports games, competitive games, roll-playing games, music playing games, dancing games and so on.

Furthermore, the present invention can be applied to various image generation systems such as arcade game systems, home game systems, large-scaled multi-player attraction systems, simulators, multimedia terminals, image generation systems, game image generation system boards and so on.

What is claimed is:

1. An image generation method comprising:
automatically determining whether or not an intervening object intervenes between a first computer object controlled by a computer and a player's object controlled by a player or viewpoint;
controlling an action of the first computer object according to the determination; and
generating an image containing the image of the first computer object;
wherein acting on the player by the first computer object is prohibited or restricted when the intervening object intervenes between the first computer object and the player's object or viewpoint.

2. The image generation method as defined in claim 1, wherein whether or not the intervening object intervenes between the first computer object and the player's object or viewpoint is determined by determining whether or not the intervening object exists on a line connecting between the first computer object and the player's object or viewpoint.

3. The image generation method as defined in claim 1, wherein the first computer object is erased when the first computer object moves out of the player's view.

4. The image generation method as defined in claim 1, wherein the first computer object is an object attacking the player, and
wherein the attack of the first computer acts on the player without obstruction by the intervening object.

5. An image generation method comprising:
automatically determining whether or not an intervening object intervenes between a first computer object controlled by a computer and a player's object controlled by a player or viewpoint;
controlling an action of the first computer object according to the determination; and
generating an image containing the image of the first computer object;
wherein the first computer object is moved to a given moving target position when the intervening object intervenes between the first computer object and the player's object or viewpoint.

6. The image generation method as defined in claim 5, wherein whether or not the intervening object intervenes between the first computer object and the player's object or viewpoint is determined by determining whether or not the intervening object exists on a line connecting between the first computer object and the player's object or viewpoint.

7. The image generation method as defined in claim 5, wherein the first computer object is erased when the first computer object moves out of the player's view.

8. The image generation method as defined in claim 5, wherein the first computer object is an object attacking the player, and
wherein the attack of the first computer acts on the player without obstruction by the intervening object.

9. An image generation method comprising:
automatically determining whether or not an intervening object intervenes between a first computer object controlled by a computer and a player's object controlled by a player or viewpoint;
controlling an action of the first computer object according to the determination; and
generating an image containing the image of the first computer object;
wherein the first computer object is made to stand by when the intervening object is a second computer object controlled by the computer.

10. The image generation method as defined in claim 9, wherein whether or not the intervening object intervenes between the first computer object and the player's object or viewpoint is determined by determining whether or not the intervening object exists on a line connecting between the first computer object and the player's object or viewpoint.

11. The image generation method as defined in claim 9, wherein the first computer object is erased when the first computer object moves out of the player's view.

12. The image generation method as defined in claim 9, wherein the first computer object is an object attacking the player, and
wherein the attack of the first computer acts on the player without obstruction by the intervening object.

13. An image generation method comprising:
automatically determining whether or not an intervening object intervenes between a first computer object controlled by a computer and a player's object controlled by a player or viewpoint;
controlling an action of the first computer object according to the determination; and generating an image containing the image of the first computer object;

wherein a motion of the first computer object is generated by a physical simulation;

wherein the motion of the first computer object is generated by a physical simulation when hitting;

wherein whether or not the intervening object intervenes between the first computer object and the player's object or viewpoint is determined when a given time has elapsed after the hitting; and wherein the action of the first computer object is controlled according to the determination.

14. The image generation method as defined in claim 13, wherein whether or not the intervening object intervenes between the first computer object and the player's object or viewpoint is determined by determining whether or not the intervening object exists on a line connecting between the first computer object and the player's object or viewpoint.

15. The image generation method as defined in claim 13, wherein the first computer object is erased when the first computer object moves out of the player's view.

16. The image generation method as defined in claim 13, wherein the first computer object is an object attacking the player, and wherein the attack of the first computer acts on the player without obstruction by the intervening object.

17. A computer-usable program embodied on an information storage medium or embodied in a carrier wave transmitted by a transmitter or received by a receiver, the program comprising a processing routine for implementing:

means for determining whether or not an intervening object intervenes between a first computer object controlled by a computer and a player's object controlled by a player or viewpoint, and for controlling an action of the first computer object according to the determination; and means for generating an image containing the image of the first computer object;

wherein acting on the player by the first computer object is prohibited or restricted when the intervening object intervenes between the first computer object and the player's object or viewpoint.

18. The program as defined in claim 17, wherein whether or not the intervening object intervenes between the first computer object and the player's object or viewpoint is determined by determining whether or not the intervening object exists on a line connecting between the first computer object and the player's object or viewpoint.

19. The program as defined in claim 17, wherein the first computer object is erased when the first computer object moves out of the player's view.

20. The program as defined in claim 17, wherein the first computer object is an object attacking the player, and wherein the attack of the first computer acts on the player without obstruction by the intervening object.

21. A computer-usable program embodied on an information storage medium or embodied in a carrier wave transmitted by a transmitter or received by a receiver, the program comprising a processing routine for implementing:

means for determining whether or not an intervening object intervenes between a first computer object controlled by a computer and a player's object controlled by a player or viewpoint, and for controlling an action of the first computer object according to the determination; and means for generating an image containing the image of the first computer object;

wherein the first computer object is moved to a given moving target position when the intervening object intervenes between the first computer object and the player's object or viewpoint.

22. The program as defined in claim 21, wherein whether or not the intervening object intervenes between the first computer object and the player's object or viewpoint is determined by determining whether or not the intervening object exists on a line connecting between the first computer object and the player's object or viewpoint.

23. The program as defined in claim 21, wherein the first computer object is erased when the first computer object moves out of the player's view.

24. The program as defined in claim 21, wherein the first computer object is an object attacking the player, and wherein the attack of the first computer acts on the player without obstruction by the intervening object.

25. A computer-usable program embodied on an information storage medium or embodied in a carrier wave transmitted by a transmitted or received by a receiver, the program comprising a processing routine for implementing:

means for determining whether or not an intervening object intervenes between a first computer object controlled by a computer and a player's object controlled by a player or viewpoint, and for controlling an action of the first computer object according to the determination; and means for generating an image containing the image of the first computer object;

wherein the first computer object is made to stand by when the intervening object is a second computer object controlled by the computer.

26. The program as defined in claim 25, wherein whether or not the intervening object intervenes between the first computer object and the player's object or viewpoint is determined by determining whether or not the intervening object exists on a line connecting between the first computer object and the player's object or viewpoint.

27. The program as defined in claim 25, wherein the first computer object is erased when the first computer object moves out of the player's view.

28. The program as defined in claim 25, wherein the first computer object is an object attacking the player, and wherein the attack of the first computer acts on the player without obstruction by the intervening object.

29. A computer-usable program embodied on an information storage medium or embodied in a carrier wave transmitted by a transmitter or received by a receiver, the program comprising a processing routine for implementing:

means for determining whether or not an intervening object intervenes between a first computer object controlled by a computer and a player's object controlled by a player or viewpoint, and for controlling an action of the first computer object according to the determination; and means for generating an image containing the image of the first computer object;

wherein a motion of the first computer object is generated by a physical simulation;
wherein the motion of the first computer object is generated by a physical simulation when hitting;
wherein whether or not the intervening object intervenes between the first computer object and the player's object or viewpoint is determined when a given time has elapsed after the hitting; and
wherein the action of the first computer object is controlled according to the determination.

30. The program as defined in claim 29,
wherein whether or not the intervening object intervenes between the first computer object and the player's object or viewpoint is determined by determining whether or not the intervening object exists on a line connecting between the first computer object and the player's object or viewpoint.

31. The program as defined in claim 29,
wherein the first computer object is erased when the first computer object moves out of the player's view.

32. The program as defined in claim 29,
wherein the first computer object is an object attacking the player, and wherein the attack of the first computer acts on the player without obstruction by the intervening object.

\* \* \* \* \*